(12) United States Patent
Bosch et al.

(10) Patent No.: US 12,147,053 B2
(45) Date of Patent: Nov. 19, 2024

(54) REMOVABLE FACIAL INTERFACE

(71) Applicant: Apple Inc., Cupertino, CA (US)

(72) Inventors: Erin M. Bosch, San Jose, CA (US); Darshan R. Kasar, San Francisco, CA (US); Timon A. Wright, San Francisco, CA (US); Nicholas R. Trincia, San Francisco, CA (US); Jonathan M. Anderson, San Francisco, CA (US); Liam R. Martinez, San Francisco, CA (US); Ian A. Guy, Santa Cruz, CA (US); Paul X. Wang, Cupertino, CA (US); Samuel G. Smith, San Francisco, CA (US); Jeffrey A. Griffis, San Carlos, CA (US); Andrew Gallaher, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/470,408

(22) Filed: Sep. 19, 2023

(65) Prior Publication Data
US 2024/0103287 A1 Mar. 28, 2024

Related U.S. Application Data

(60) Provisional application No. 63/376,743, filed on Sep. 22, 2022.

(51) Int. Cl.
*G02B 27/01* (2006.01)

(52) U.S. Cl.
CPC ............... *G02B 27/0176* (2013.01)

(58) Field of Classification Search
CPC .................................. G02B 27/0176
USPC .......................................... 345/8
See application file for complete search history.

(56) References Cited

U.S. PATENT DOCUMENTS

| | | | | |
|---|---|---|---|---|
| 10,591,736 B1* | 3/2020 | Bristol | ............... | G02B 27/0955 |
| 11,163,166 B1* | 11/2021 | Ebert | ................ | G02B 27/0176 |
| 2018/0307362 A1* | 10/2018 | Komala | ................... | G01L 1/20 |
| 2019/0086676 A1* | 3/2019 | Reed | ................... | G02B 27/0176 |
| 2022/0055798 A1* | 2/2022 | Morris | ..................... | B32B 7/12 |

* cited by examiner

*Primary Examiner* — Calvin C Ma
(74) *Attorney, Agent, or Firm* — Dorsey & Whitney LLP

(57) ABSTRACT

A removable facial interface for a head-mountable device (HMD) is disclosed. In an example, an HMD includes a display; a facial interface frame at least partially surrounding the display; a removable facial interface attached to the facial interface frame; a first attachment mechanism attached to one of the facial interface frame or the removable facial interface; and a second attachment mechanism attached to the other of the facial interface frame or the removable facial interface, the removable facial interface being attached to the facial interface frame by the first attachment mechanism and the second attachment mechanism.

20 Claims, 10 Drawing Sheets

REMOVABLE FACIAL INTERFACE

CROSS-REFERENCE TO RELATED APPLICATION(S)

This claims priority to U.S. Provisional Patent Application No. 63/376,743, filed 22 Sep. 2022, and entitled "Removable Facial Interface," the entire disclosure of which is hereby incorporated by reference.

FIELD

The described examples relate generally to facial interfaces of a head-mountable device. More particularly, the present examples relate to removable facial interfaces of a head-mountable device that can be easily removed and reinstalled or replaced to provide increased comfort, cleanliness, and customization.

BACKGROUND

Recent advances in portable computing have enabled head-mountable devices that provide augmented and virtual reality (AR/VR) experiences to users. Head-mountable devices typically include various components such as a display, a viewing frame, a lens, a battery, a motor, a speaker, and other components. These components can operate together to provide an immersive user experience. In particular, head mountable-devices include components that help provide a distraction-free setting by blocking or sealing out the outer environment (e.g., ambient light).

Prolonged use of head-mountable devices can result in various components of the head-mountable devices becoming dirty (e.g., from a user sweating on the facial interface) and worn out. Users of head-mountable devices have a myriad of different anatomical features (e.g., head size, eye location, cheek and forehead bone structure, and the like), as well as different personal preferences. As a result, the ability to vary or customize the engagement with the head-mountable device is desired.

SUMMARY

According to some aspects of the present disclosure, a head-mountable device (HMD) can include a display; a facial interface frame at least partially surrounding the display; a removable facial interface attached to the facial interface frame; a first attachment mechanism attached to one of the facial interface frame or the removable facial interface; and a second attachment mechanism attached to the other of the facial interface frame or the removable facial interface. In some examples, the removable facial interface can be attached to the facial interface frame by the first attachment mechanism and the second attachment mechanism.

In some examples, the first attachment mechanism and the second attachment mechanism can include magnets. In some examples, the first attachment mechanism can include a spherical magnetic receptacle. The second attachment mechanism can include a spherical magnet. In some examples, the first attachment mechanism can include a capsule-dished magnetic receptacle. The second attachment mechanism can include a spherical magnet. In some examples, the first attachment mechanism can include a magnetic post. The second attachment mechanism can include a magnetic protrusion. The first attachment mechanism can be configured to slidably engage and disengage the second attachment mechanism.

In some examples, the first attachment mechanism and the second attachment mechanism can include hook-and-loop fasteners. In some examples, the first attachment mechanism can include a post and a flange on the post. The second attachment mechanism can include a spring-snap feature. The spring-snap feature can include an opening; a detent adjacent the opening; and a spring attached to the detent.

In some examples, the first attachment mechanism can include a receptacle and a first magnet in the receptacle. The second attachment mechanism can include a protrusion and a second magnet in the protrusion. The protrusion can have a first shape complementary to a second shape of the receptacle.

In some examples, the first attachment mechanism and the second attachment mechanism can include interlocking elastic fasteners. In some examples, the first attachment mechanism can include a suction cup. The second attachment mechanism can include a curved surface shaped to interface with the suction cup.

In some examples, the removable facial interface can be C-shaped. The facial interface frame can include a C-shaped base complementary to the removable facial interface.

In some examples, the removable facial interface can include a fabric material encircling one of the first attachment mechanism or the second attachment mechanism. The facial interface frame can include a compressible material encircling the other of the first attachment mechanism or the second attachment mechanism. The first attachment mechanism can be directly attached to the second attachment mechanism.

According to some aspects, a wearable electronic device can include a display; a facial interface frame physically coupled to the display; and a removable facial interface removably attached to the connector of the facial interface frame by a first attachment mechanism. The facial interface frame may include a frame partially surrounding the display; a connector attached to the frame; and a base attached to the connector. The connector may extend through the base.

In some examples, the first attachment mechanism can include a magnetic attachment mechanism. The magnetic attachment mechanism can include a post on one of the connector or the removable facial interface, and a receptacle on the other of connector or the removable facial interface.

In some examples, the first attachment mechanism can include a hook-and-loop attachment mechanism. The hook-and-loop attachment mechanism can include a post on one of the connector or the removable facial interface and a receptacle on the other of connector or the removable facial interface.

In some examples, the wearable electronic device can further include a compressible member attached to the base. The compressible member can encircle the connector and the connector can be exposed through the compressible member.

According to some aspects, a light seal for a head-mountable device can include a facial interface frame. The light seal can include a base; a compressible portion; and a magnet attached to the base.

In some examples, the light seal can further include a hook-and-loop fastener attached to the base. In some examples, the light seal can further include an interlocking fastener attached to the base. In some examples, the light seal can further include a receptacle attached to the base.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
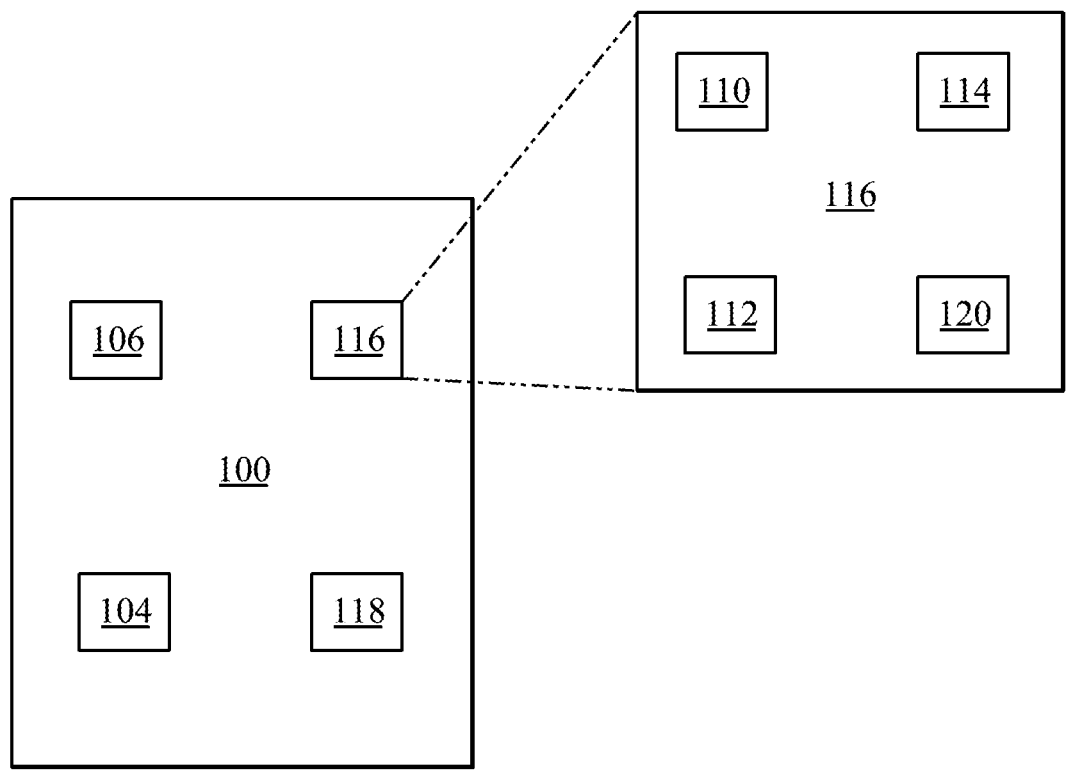
FIG. 1A is a schematic block diagram of an example of a head-mountable device.

Representative examples illustrated in the accompanying drawings will be described in detail below. The following descriptions are not intended to limit the examples to one preferred example. Rather, they are intended to cover alternatives, modifications, and equivalents as can be included within the spirit and scope of the described examples as defined by the appended claims.

The following disclosure relates to wearable electronic devices (e.g., head-mountable devices (HMDs)), including those that include a removable facial interface. Prolonged use of a head-mountable device can cause components of the head-mountable device to wear and to become dirty. In particular, components of the head-mountable device that contact a user's face are subject to wear and becoming dirty due to the contact with the user's face. It can be desirable to clean the portions of the head-mountable device that contact the user's face in order to remove oils, sweat, and the like. However, the head-mountable device can include sensitive components, small components, and oddly shaped components that are difficult to clean in-situ. Further, it can be desirable to replace portions of the head-mountable device that contact the user's face when those portions become worn out, in order to obtain a more comfortable fit for specific users, based on other user preferences, or the like.

A head-mountable device of the present disclosure includes a removable facial interface. As will be discussed in detail below, the removable facial interface can be attached to a facial interface frame through various attachment mechanisms, such as magnets, interlocking features, sliding features, hook-and-loop features (e.g., Velcro), spring snaps, suction features, bi-stable features, stretch features, re-usable adhesives, mating posts, combinations thereof, or the like. The removable facial interface can be easily removed from the facial interface frame, and can be re-installed on the facial interface frame in order to allow for the removable facial interface to be cleaned, replaced, or the like. Allowing the removable facial interface to be removed and cleaned increases the longevity of the removable facial interface. Replacing the removable facial interface improves the longevity of the head-mountable device, reduces user costs, provides users with choices of removable facial interfaces based on fit and personal preferences, and provides additional benefits.

These and other examples are discussed below with reference to FIGS. 1A through 13B. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1A illustrates a block diagram of a head-mountable device (HMD) 100 including a display 106, a frame 104, a device seal 116, and a retention band 118. The display 106 can include one or more optical lenses or display screens that are configured to be positioned in front of the eyes of a user. The display 106 can be configured to present an augmented reality visualization, a virtual reality visualization, or another suitable visualization to the user. The display 106 can be positioned at least partially in or on the frame 104. The frame 104 can be a housing of the display 106. The device seal 116 can be physically coupled to the frame 104. The retention band 118 can be physically coupled to the device seal 116 and/or the frame 104, and can be used to secure the HMD 100 on the head of the user. In some examples, the device seal 116 includes the frame 104 (e.g., the frame 104 is part of the device seal 116).

The device seal 116 includes a facial interface frame 112, a removable facial interface 110, a cover 114, and electrical components (e.g., sensors 120). The device seal 116 can also be referred to as a light seal. In some examples, the device seal 116 can refer to a portion of the HMD 100 that engages or shields a user's face. The device seal 116 can include portions of the HMD 100 that conform to, contact, or press against regions of the user's face (e.g., the facial interface frame 112 and the removable facial interface 110).

The removable facial interface 110 refers to a portion of the HMD 100 that directly contacts a user's face. The facial interface frame 112 refers to a portion of the HMD 100 to which the removable facial interface 110 is attached, and which is physically coupled between the removable facial interface 110 and the frame 104. The removable facial interface 110 and/or the facial interface frame 112 can also be referred to as a face track. The removable facial interface 110 and the facial interface frame 112 can conform to (e.g., compress against and assume the shape of) regions of the user's face. In some examples, the removable facial interface 110 and the facial interface frame 112 include pliant (or semi-pliant) materials that span the forehead, wrap partially around the eyes, and contact the zygoma and maxilla regions of the user's face.

In some examples, the facial interface frame 112 can be formed of a relatively stiff or rigid material, while the removable facial interface 110 can be formed of a relatively soft, deformable, elastic material. In some examples, the facial interface frame 112 can be formed from plastics, metals, polymers, combinations thereof, or the like. The removable facial interface 110 can be formed from plastics, metals, polymers, fabrics, foams, rubbers, silicone, elastomers, hydrogels, combinations thereof, or the like. In some examples, the removable facial interface 110 can include a stiffener, which can be formed from metals, plastics, polymers, combinations thereof, or the like. The removable facial interface 110 can include a pliable material surrounding the stiffener, which can be formed from rubbers, foams, polymers, silicone, elastomers, hydrogen gels, combinations thereof, or the like. The pliable material can be formed around the stiffener through overmolding or the like. The removable facial interface 110 can further include a fabric material surrounding the pliable material. The fabric material can be wrapped around the pliable material. The stiffener can provide the removable facial interface 110 with a desired degree of stiffness. The pliable material can be pliant or semi-pliant, and can be provided to increase user comfort. The fabric material can be configured to contact a user's skin, and can also be provided to increase user comfort.

The removable facial interface 110 can be attached to the facial interface frame 112 through various attachment mechanisms. For example, the attachment mechanisms can include magnets, interlocking features, sliding features, hook-and-loop features (e.g., Velcro), spring snaps, suction features, bi-stable features, stretch features, re-usable adhesives, mating posts, combinations thereof, or the like. The attachment mechanisms can be provided on both the removable facial interface 110 and the facial interface frame 112. For example, a male attachment mechanism can be provided on the removable facial interface 110 and a female attachment mechanism can be provided on the facial interface frame 112, or vice versa. The attachment mechanisms can be self-aligning, or can entail alignment by a user. The attachment mechanisms can be configured such that the removable facial interface 110 is removed from, and attached to, the facial interface frame 112 in one-handed operations. Each of the respective attachment mechanisms can datum the removable facial interface 110 to the facial interface frame 112, or allow the removable facial interface 110 to float or move relative to the facial interface frame 112. The respective attachment mechanisms can have variable shapes and/or sizes around the perimeters of the removable facial interface 110 and the facial interface frame 112, which can improve the ability to interchange various removable facial interfaces 110 and facial interface frames 112. More specifically, the variable shapes and/or sizes of the attachment mechanisms around the perimeters of the removable facial interface 110 and the facial interface frame 112 can allow for different shaped removable facial interfaces 110 and facial interface frames 112 to be connected together.

Providing the removable facial interface 110 and the facial interface frame 112 allows for the removable facial interface 110 to be easily removed and cleaned. The removable facial interface 110 can be replaced based on wear, user preferences, or the like. For example, specific removable facial interfaces 110 can be provided based on different facial structures of various users. Removable facial interfaces 110 can be provided based on different intended user uses, such as a specific removable facial interface 110 designed for sport use. Providing the removable facial interface 110 allows for a portion of the HMD 100 that is subject to the greatest amount of wear to be cheaply and easily replaced.

The cover 114 can include a seal, such as an environment seal, a dust seal, an air seal, a light seal, or the like. The cover 114 can be positioned in a gap between the display 106 and the user's face. The cover 114 can form an eye-box through which the user can view the display 106. It will be appreciated that the term "seal" can include partial seals or inhibitors, in addition to complete seals. For example, a seal can be a partial light seal, where some ambient light is blocked. In some examples, a seal can be a complete light seal where all ambient light is blocked when the HMD 100.

The cover 114 can be a woven fabric that is non-rigid or deformable. The cover 114 can be elastically deformable. In some examples, the cover 114 can be formed from a plastic, a rubber, a polymer material, or the like. The cover 114 can be a cosmetic textile material with stretch, and can feature an open mesh pattern. In some examples, the cover 114 can be rigid. Providing the removable facial interface 110 separate from the cover 114 allows for the cover 114 and a material covering the removable facial interface 110 to be formed from different materials, such as the cover 114 being formed from a cosmetic material and the removable facial interface 110 being formed from a comfortable material. In some examples, the cover 114 and the covering of the removable facial interface 110 can be formed from the same materials.

The device seal 116 can be removably attached to the frame 104. The device seal 116 can be electrically coupled to the display 106. The device seal 116 can include various electrical components, such as the sensors 120. The sensors 120 can include various sensors, such as sensors that collect user data, or environmental data. In some examples, the sensors 120 can collect biometric information. The sensors 120 can transmit signals to other components of the HMD 100, such as the display 106. The sensors 120 can transmit signals to various outputs, such as an output configured to perform an action in response to information collected by the sensors 120.

Figure 1B:
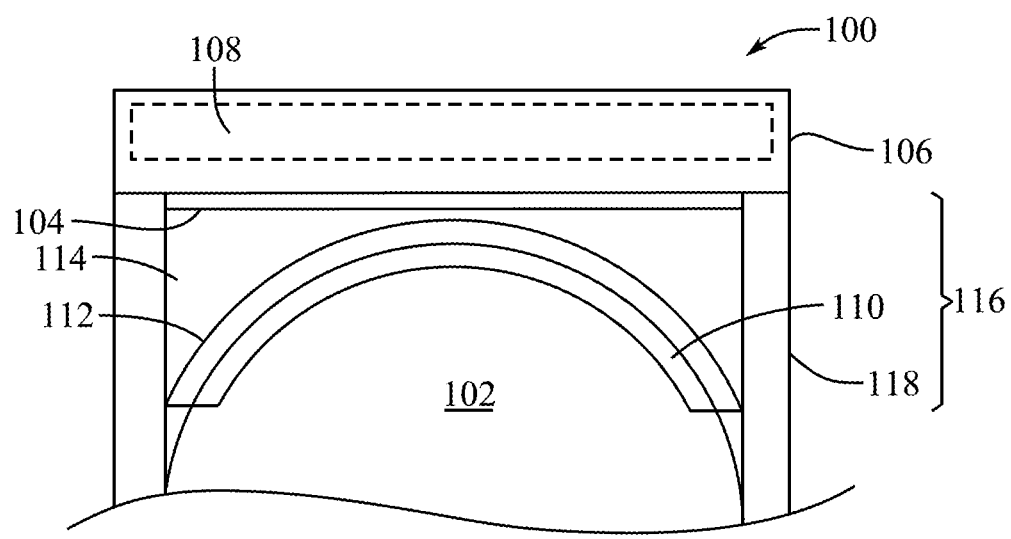
FIG. 1B is a top view of an example of a head-mountable device.

FIG. 1B illustrates a top view of an HMD 100. The HMD 100 of FIG. 1B can be substantially similar to, including some or all of the features of, the HMD 100 described with respect to FIG. 1A. The HMD 100 includes a display (also referred to as a display unit) 106 and a retention band 118. In some examples, the display 106 includes an opaque, translucent, transparent, or semi-transparent screen, including any number lenses, for presenting visual data to a user. The display 106 can include any number of internal electronic components 108. The HMD 100 can be mounted on a user's head 102 using the retention band 118.

The HMD 100 further includes a frame 104 (also referred to as a housing), a facial interface frame 112, a removable facial interface 110, and a cover 114. The frame 104 can be physically coupled to the display 106. The frame 104 can at least partially border one or more edges of the display 106. One end of the cover 114 can be attached to the frame 104 and an opposite end of the cover 114 can be attached to the facial interface frame 112. The facial interface frame 112 and the removable facial interface 110 provide an interface between a user's head 102 and the frame 104. The combination of the frame 104, the facial interface frame 112, the removable facial interface 110, and the cover 114 can form a device seal 116. It will be understood, however, that the device seal 116 can include fewer or additional components from those listed or shown.

The HMD 100 can be worn on the user's head 102 such that the display 106 is positioned on the user's face and disposed in front of one or both of the user's eyes. The display 106 can be physically coupled to the retention band 118 and/or the device seal 116. In some examples, the retention band 118 can be positioned against sides of the user's head 102 and in contact therewith. In some examples, the retention band 118 can be at least partially positioned above the user's ear or ears. In some examples, the retention band 118 can be positioned adjacent to the user's ear or ears. The retention band 118 can extend around the user's head 102. In this way, the display 106 and the retention band 118 can form a loop configured to retain the HMD 100 on the user's head 102. It should be understood, however, that this configuration is just one example of how the components of the HMD 100 can be arranged. In some examples, a different number of connector straps and/or retention bands can be included. Although the HMD 100 is referred to as an HMD, it should be understood that the terms wearable device, wearable electronic device, HMD device, and/or HMD system can be used to refer to any wearable device, including smart glasses.

In some examples, the frame 104 is physically coupled to the facial interface frame 112. The removable facial interface 110 is removably attached to the facial interface frame 112. The removable facial interface 110 can contact the user's head 102, such as a user's face. In some examples, the cover 114 can be a light blocking component that extends between the frame 104 and the removable facial interface 110, such as along portions of the facial interface frame 112. The cover 114 can cover or surround a perimeter of the frame 104 and/or the facial interface frame 112.

The cover 114 can be formed from a cloth, fabric, woven material, plastic, rubber, or any other suitable opaque or semi-opaque material. In some examples, the cover 114 is flexible, having the ability to repeatedly stretch, compress, and deform. The cover 114 can be elastically or in-elastically deformable. The facial interface frame 112, the cover 114, and the removable facial interface 110 can be configured to block outside light and limit the peripheral view of the user. In some examples, the cover 114 and the facial interface frame 112 are part of the same or a unitary component.

Any of the features, components, and/or parts, including the arrangements and configurations thereof shown in FIGS. 1A and 1B can be included, either alone or in any combination, in any of the other examples of devices, features, components, and parts shown in the other figures, including in any of FIGS. 1A and 1B, described herein. Likewise, any of the features, components, and/or parts, including the arrangements and configurations thereof shown and described with reference to the other figures can be included, either alone or in any combination, in the example of the devices, features, components, and parts shown in FIGS. 1A and 1B.

Figure 2A:
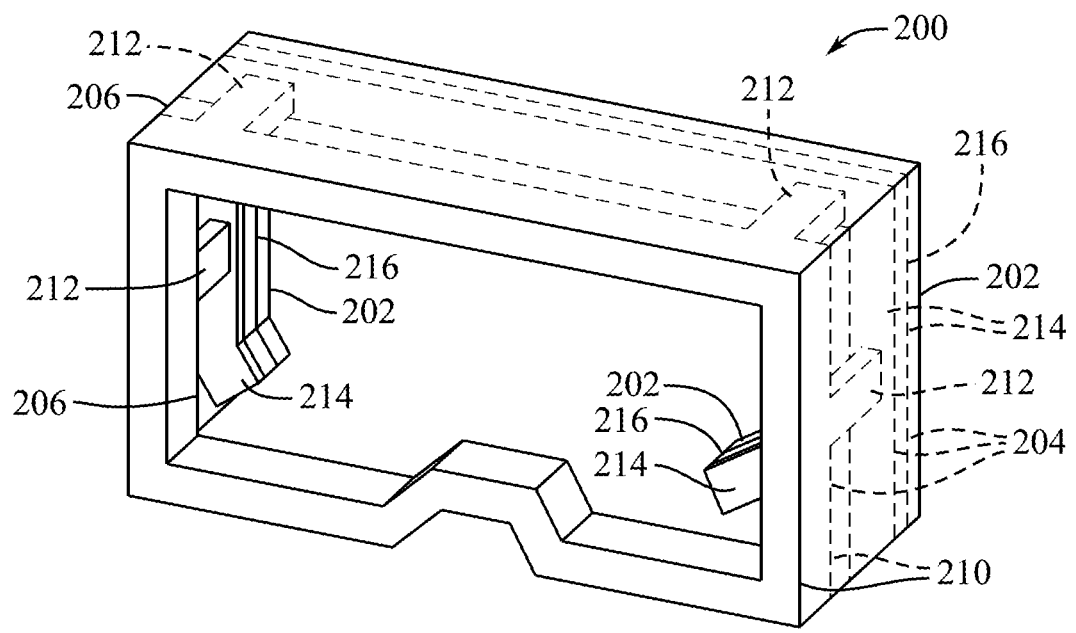
FIG. 2A is a perspective view of an example of a device seal.

FIG. 2A illustrates a perspective view of a device seal 200. The device seal 200 can be substantially similar to, including some or all of the features of, the device seals described herein, such as the device seal 116. The device seal 200 can be implemented on an HMD, such as the HMD 100 described in reference to FIGS. 1A and 1B. The device seal 200 can include a removable facial interface 202, a facial interface frame 204, and a cover 206. The removable facial interface 202, the facial interface frame 204, and the cover 206 can be substantially similar to, including some or all of the features of, the removable facial interface 110, the facial interface frame 112, and the cover 114, respectively. The cover 206 can be included in the device seal 200 to provide a seal between the device seal 200 and the outer environment.

The facial interface frame 204 can include a frame 210, connectors 212, a base 214, and a compressible portion 216. The frame 210 can be physically coupled to a display of the HMD, and the frame 210 can be configured provide an interface between the display and the facial interface frame 204. The removable facial interface 202 can be removably attached to the base 214, and the base 214 can be configured provide an interface between the removable facial interface 202 and the facial interface frame 204. The connectors 212 can be configured to provide a desired distance between the display and a user's eyes when the HMD is donned by the user. The connectors 212 and/or the base 214 can include attachment mechanisms that are used to attach the removable facial interface 202 to the facial interface frame 204.

The compressible portion 216 can be included in the facial interface frame 204 to fill a gap between the base 214 and the removable facial interface 202, and to provide improved user comfort. The compressible portion 216 can also be referred to as a compressible member or a compressible material. In some examples, the connectors 212 (e.g., an attachment mechanism) can extend through the compressible portion 216. The compressible portion 216 can encircle portions of the connectors 212 that extend through the compressible portion 216. The connectors 212 can also extend through the base 214, and attachment mechanisms provided on the connectors 212 can be exposed through both the compressible portion 216 and the base 214 for access and connection. In some examples, the compressible portion 216 can include a foam material. In some examples, the compressible portion 216 can include materials with properties that impart flexibility, softness, compressibility, deformability, and the like. Examples of materials that can be used for the compressible portion 216 include silicone, polymers, elastomers, hydrogels, combinations thereof, or the like. The compressible portion 216 can be formed by molding, printing, casting, or the like. In some examples, attachment mechanisms, such as perimeter attachments, can be included on the compressible portion 216. The compressible portion 216 provides a soft, flexible, deformable interface between the removable facial interface 202 and rigid components of the removable facial interface 202, such as the frame 210, the connectors 212, and the base 214. This interface provides for improved user comfort when the HMD is donned.

The removable facial interface 202 is a removable component that is configured to contact a user's face. The removable facial interface 202 can be formed of conformable and comfortable materials. The removable facial interface 202 is configured to be easily removed from and attached to the facial interface frame 204. This allows for the removable facial interface 202 to be removed, cleaned, replaced, and the like. In some examples, the attachment mechanisms used to attach the removable facial interface 202 to the facial interface frame 204 can be simple mechanisms that allow the removable facial interface 202 to be removed from and attached to the facial interface frame 204 in a one-handed manner. Alignment features can be provided on the removable facial interface 202 and/or the facial interface frame 204 to aid in the alignment of the removable facial interface 202 with respect to the facial interface frame 204. Providing the removable facial interface 202 as a removable component allows the removable facial interface 202 to be easily cleaned, replaced as a result of wear, replaced due to user preferences, and the like. This reduces maintenance costs for HMDs including the removable facial interface 202.

The removable facial interface 202 can be formed of a relatively pliant material, while the components of the facial interface frame 204 are formed of relatively rigid materials. This allows the removable facial interface 202 to conform to the shape of the facial interface frame 204 and the shape of a user's face or head when the user dons the HMD. As illustrated in FIG. 2A, the base 214, the compressible portion 216, and the removable facial interface 202 can be C-shaped and can have shapes corresponding to one another. In other words, the removable facial interface 202 is C-shaped, and the base 214 and the compressible portion 216 are C-shaped and complementary to the C-shaped removable facial interface 202. This provides a visual cue to users when the removable facial interface 202 is removed from the base 214 that the removable facial interface 202 is intended to be attached to the base 214. In some examples, attachment mechanisms on the removable facial interface 202 and the facial interface frame 204 can be visible when the removable facial interface 202 is removed from the facial interface frame 204, which provides further visual cues as to how the removable facial interface 202 is intended to be attached to the facial interface frame 204. Moreover, upon seeing the attachment mechanisms on the facial interface frame 204, a user can realize that something is missing from the facial interface frame 204 when the removable facial interface 202 is removed from the facial interface frame 204.

Figure 2B:
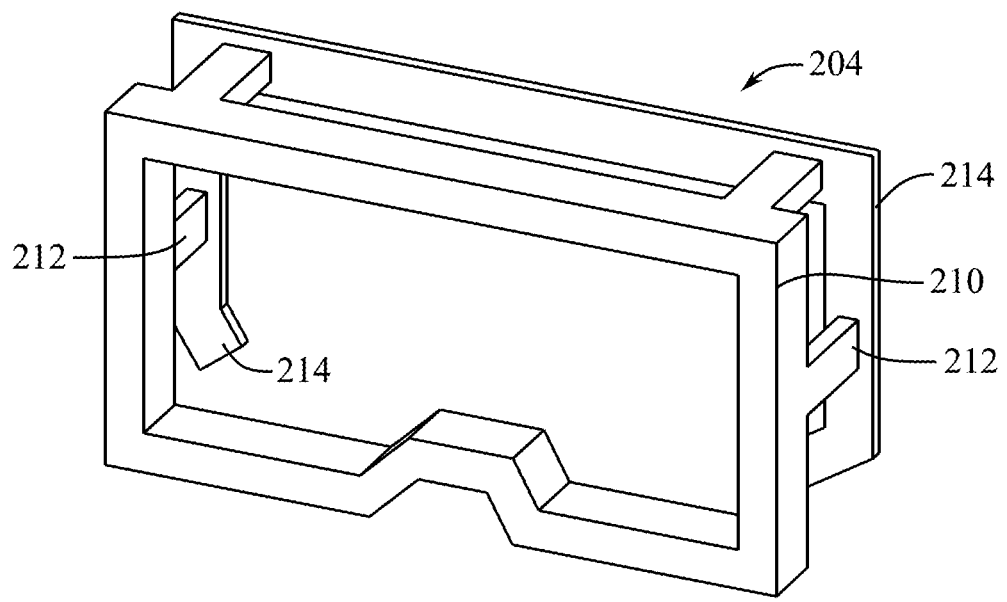
FIG. 2B is a perspective view of an example of a facial interface frame.

FIG. 2B illustrates a perspective view of a facial interface frame 204. The facial interface frame 204 can include a frame 210, connectors 212, and a base 214. The frame 210, the connectors 212, and the base 214 of the facial interface frame 204 can be formed of relatively rigid materials, such as plastics, metals, polymers, combinations thereof, or the like. In some examples, the base 214 can be formed of a relatively flexible material, such that the base 214 is allowed to flex when an HMD including the facial interface frame 204 is donned by a user. In some examples, the frame 210, the connectors 212, and/or the base 214 can include rigid materials that can be coated in relatively soft materials, such as polymers, fabrics, foams, rubbers, silicone, elastomers, hydrogels, combinations thereof, or the like to increase user comfort.

The frame 210 can provide an interface between a display of the HMD and the facial interface frame 204. For example, the frame 210 can be physically coupled to the display of the HMD and can hold the display in a desired position. The connectors 212 can control the spacing between the display and a user's face. For example, depending on a length of the connectors 212, the display can be disposed closer to or further from a user's face. The base 214 and/or the connectors 212 can provide an interface between the facial interface frame 204 and a removable facial interface. For example, attachment mechanisms can be included on the base 214 and/or the connectors 212 and can be used to removably attach the removable facial interface to the base 214 and/or the connectors 212.

In some examples, post attachments can be provided on the connectors 212 and perimeter attachments can be provided on the base 214. As will be discussed in detail below, the post attachments and corresponding attachment mechanisms on the removable facial interface can be configured to remain fixed relative to one another or have a limited amount of travel when the removable facial interface is mounted to the facial interface frame 204. The perimeter attachments and corresponding attachment mechanisms on the removable facial interface can be configured to slide relative to one another when the removable facial interface is mounted to the facial interface frame 204. Including both the post attachments and the perimeter attachments allows the removable facial interface to be securely mounted on the facial interface frame 204, while allowing the removable facial interface to conform comfortably to a user's face.

Figure 2C:
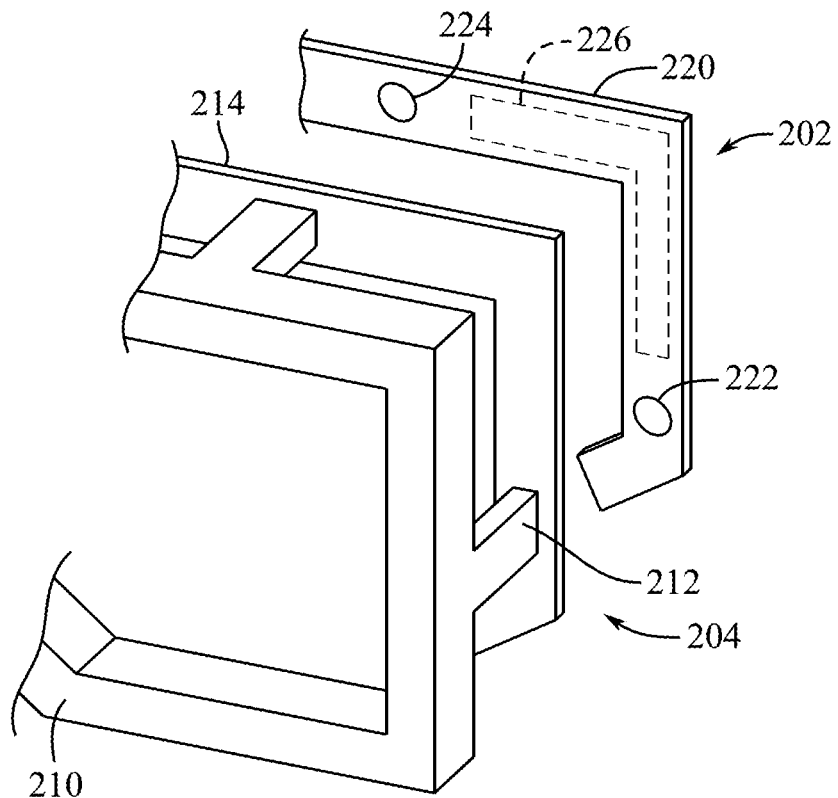
FIG. 2C is a perspective view of an example of a facial interface frame and a removable facial interface.

FIG. 2C illustrates a perspective view of portions of a removable facial interface 202 and a facial interface frame 204. The removable facial interface 202 can include a body portion 220, a side mount 222, a top mount 224, and a mounting area 226. The body portion 220 can be formed of materials such as plastics, metals, polymers, fabrics, foams, rubbers, silicone, elastomers, hydrogels, combinations thereof, or the like. The facial interface frame 204 can include a frame 210, connectors 212, and a base 214.

The side mount 222, the top mount 224, and the mounting area 226 are examples of attachment mechanisms that can be included in the removable facial interface 202. The side mount 222, the top mount 224, and the mounting area 226 can be used to removably attach the removable facial interface 202 to the facial interface frame 204. In some examples, post attachments can be provided on the connectors 212 corresponding to the side mount 222 and the top mount 224. Perimeter attachments can be provided on the base 214 corresponding to the mounting area 226. Specifically, when the removable facial interface 202 is aligned with and mounted to the facial interface frame 204, the side mount 222 and the top mount 224 are aligned with corresponding post attachments on the connectors 212 and the mounting area 226 is aligned with corresponding perimeter attachments on the base 214.

The side mount 222, the top mount 224, and corresponding post attachments of the connectors 212 can include attachment mechanisms that are configured to remain fixed relative to one another, or to have a relatively small travel relative to one another (e.g., the attachment mechanisms can float relative to one another). In some examples, the side mount 222 and a corresponding post attachment can be configured to remain fixed relative to one another and the top mount 224 and a corresponding post attachment can be configured to have some travel relative to one another. In some examples, the side mount 222, the top mount 224, and corresponding post attachments can include magnets, interlocking features, sliding features, hook-and-loop features (e.g., Velcro), spring snaps, suction features, bi-stable features, stretch features, re-usable adhesives, mating posts, combinations thereof, or the like. Posts and corresponding holes or other self-aligning features can be included in the side mount 222, the top mount 224, and the post attachments in order to align the removable facial interface 202 with the facial interface frame 204. Male features can be provided in the side mount 222 and the top mount 224 and corresponding female features can be provided in the post attachments of the facial interface frame 204, or vice versa. By using the prescribed attachment mechanisms, and fixing the positions of the side mount 222 and the top mount 224 relative to the post attachments, the removable facial interface 202 can be aligned with the facial interface frame 204. Moreover, the relative positions of the removable facial interface 202 and the facial interface frame 204 can be fixed to one another during use of an HMD by a user. This prevents misalignment of the removable facial interface 202 and the facial interface frame 204 from negatively impacting a user's experience when using the HMD.

The mounting area 226 and the corresponding perimeter attachments of the facial interface frame 204 can include attachment mechanisms that are configured to slide relative to one another. For example, the mounting area 226 and the corresponding perimeter attachments can include longitudinal interlocking features, rows of interlocking features, rows of magnets, lengths of flexible magnets, lengths of hook-and-loop fasteners, combinations thereof, or the like. Male features can be provided in the mounting area 226 and corresponding female features can be provided in the perimeter attachments of the facial interface frame 204, or vice versa. In some examples, the mounting area 226 and the corresponding perimeter attachments are disposed in curved or corner regions of the removable facial interface 202 and the facial interface frame 204, respectively. The mounting area 226 and the corresponding perimeter attachments can be disposed in areas of the removable facial interface 202 and the facial interface frame 204 that move or bend when the removable facial interface 202 is mounted on the facial interface frame 204 and when an HMD including the removable facial interface 202 and the facial interface frame 204 is donned by a user. This causes an arc length of the mounting area 226 and the corresponding perimeter attachments to change. By using the prescribed attachment mechanisms, the mounting area 226 and the corresponding perimeter attachments are allowed to slide relative to one another, and the removable facial interface 202 is securely fastened to the facial interface frame 204 even when the removable facial interface 202 moves relative to the facial interface frame 204.

In the example of FIG. 2C, a single top mount 224 and a single side mount 222 are illustrated. The top mount 224 can be configured to be disposed adjacent a user's forehead when the HMD is donned and the side mount 222 can be configured to be disposed adjacent the user's cheek bones when the HMD is donned. However, any number of top mounts 224 and side mounts 222 can be included in the removable facial interface 202, and the top mounts 224 and the side mounts 222 can be configured to be disposed adjacent any portions of the user's face or head when the HMD is donned. Moreover, although the mounting area 226 is illustrated as being in a corner area of the removable facial interface 202 between the top mount 224 and the side mount 222, the mounting area 226 can be disposed in any area along the perimeter of the removable facial interface 202 and any number or length of mounting areas 226 can be included.

Figure 2D:
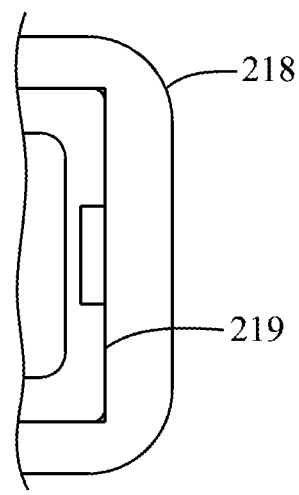
FIG. 2D is a cross-sectional view of an example of a facial interface shim.

FIG. 2D illustrates a cross-sectional view of a facial interface shim 219. The facial interface shim 219 can be used in conjunction with connectors of an HMD in order to control the spacing between a display of the HMD and a user's face. In some examples, the facial interface shim 219 can be disposed between a removable facial interface and a connector of a facial interface frame. For example, the facial interface shim 219 can be disposed in a mount opening 218 of the removable facial interface to which the connector of the facial interface frame is attached. In some examples, the facial interface shim 219 can be disposed between a base of a facial interface frame and a connector of the facial interface frame. For example, the connector can pass through the mount opening 218, and the facial interface shim 219 can be disposed between the connector and the base. The facial interface shim 219 can have a thickness in a range from about 2 mm to about 4 mm. The facial interface shim 219 allows for distances between a display of an HMD and a user's face to be altered while standard length connectors are used, which decreases manufacturing costs.

Any of the features, components, and/or parts, including the arrangements and configurations thereof shown in FIGS. 2A through 2D can be included, either alone or in any combination, in any of the other examples of devices, features, components, and parts shown in the other figures, including in any of FIGS. 2A through 2D, described herein. Likewise, any of the features, components, and/or parts, including the arrangements and configurations thereof shown and described with reference to the other figures can be included, either alone or in any combination, in the example of the devices, features, components, and parts shown in FIGS. 2A through 2D.

Figure 3A:
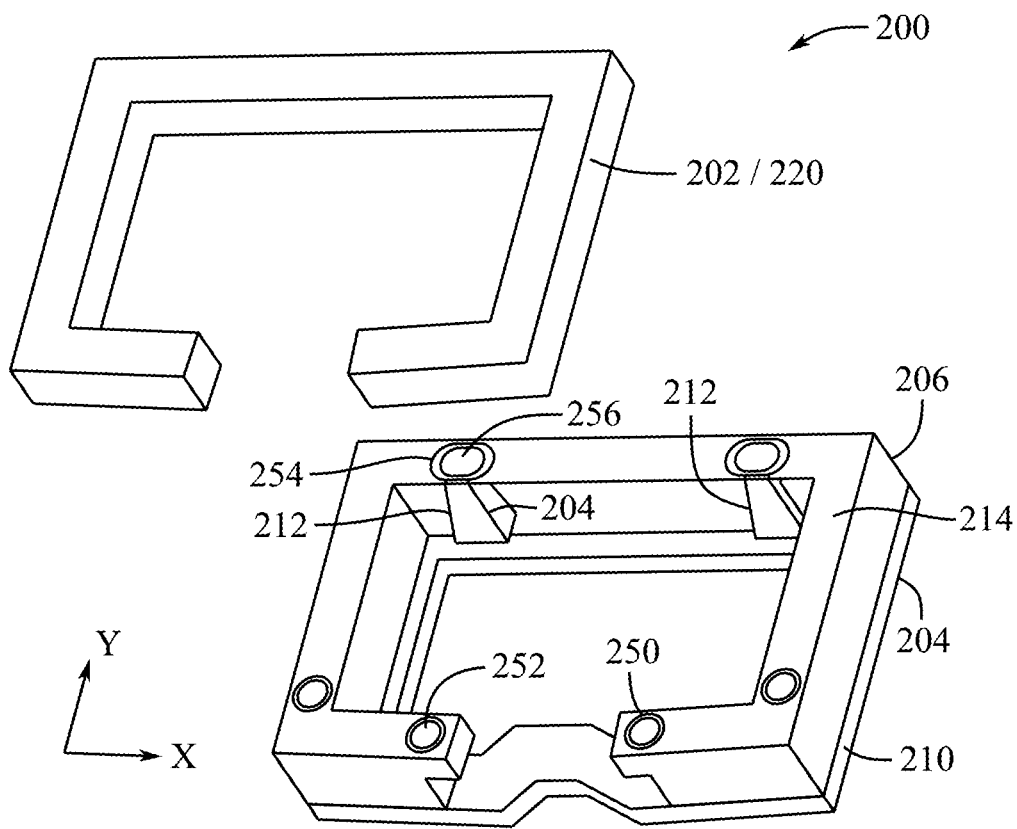
FIG. 3A is a perspective view of an example of a device seal.
Figure 3B:
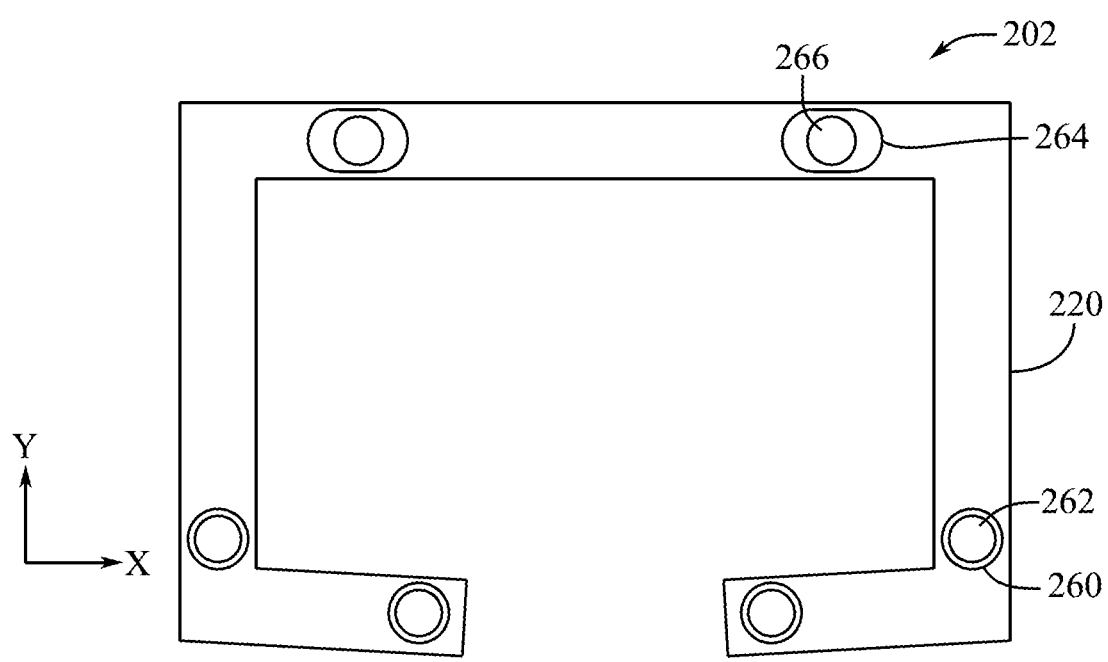
FIG. 3B is a plan view of an example of a removable facial interface.

FIGS. 3A and 3B illustrate a perspective view of a device seal 200 and a plan view of a removable facial interface 202, respectively. The device seal 200 includes the removable facial interface 202, a facial interface frame 204, and a cover 206. The device seal 200 can be substantially similar to, including some or all of the features of, the device seals described herein, such as the device seals 116 and 200. The device seal 200 can be implemented on an HMD, such as the HMD 100 described in reference to FIGS. 1A and 1B.

FIGS. 3A and 3B illustrate an example in which the attachment mechanisms used to attach the removable facial interface 202 to the facial interface frame 204 include magnets. In some examples, six connectors 212 can be provided between a base 214 and a frame 210 of the facial interface frame 204. Four circular receptacles 250 can be provided corresponding to four of the connectors 212. The connectors 212 can extend through the base 214, such that the attachment mechanisms provided on the connectors 212 are exposed through the base 214. The circular receptacles 250 can be disposed along portions of the facial interface frame 204 configured to be disposed adjacent to a user's cheek bones when an HMD including the device seal 200 is donned. A spherically-dished magnet 252 can be disposed in each of the circular receptacles 250. Each of the circular receptacles 250 in combination with a corresponding spherically-dished magnet 252 may be referred to as a spherical magnetic receptacle. Two stadium or lozenge-shaped receptacles 254 can be provided corresponding to two of the connectors 212. The stadium or lozenge-shaped receptacles 254 can be disposed along portions of the facial interface frame 204 configured to be disposed adjacent to a user's forehead when the HMD is donned. A capsule-dished magnet 256 can be disposed in each of the stadium or lozenge-shaped receptacles 254. Each of the stadium or lozenge-shaped receptacles 254 in combination with a corresponding capsule-dished magnet 256 may be referred to as a capsule-dished magnetic receptacle.

In the example of FIG. 3B, four circular receptacles 260 can be provided in the replaceable facial interface 202. The circular receptacles 260 can be disposed along portions of the replaceable facial interface 202 configured to be disposed adjacent to a user's cheek bones when the HMD is donned. A spherical magnet 262 can be disposed in each of the circular receptacles 260. Two stadium or lozenge-shaped receptacles 264 can be provided in the replaceable facial interface 202. The stadium or lozenge-shaped receptacles 264 can be disposed along portions of the replaceable facial interface 202 configured to be disposed adjacent to a user's forehead when the HMD is donned. A spherical magnet 266 can be disposed in each of the stadium or lozenge-shaped receptacles 264. Although the receptacles 250, 254, 260, and 264 and the magnets 252, 256, 262, and 266 are described as being various rounded shapes, any suitable shapes can be used.

The spherical magnets 262 can be configured to interface with the spherically-dished magnets 252, and the spherical magnets 266 can be configured to interface with the capsule-dished magnets 256. The spherical magnets 262 and the spherically-dished magnets 252 can have corresponding shapes, which provides for a small amount of relative travel between the spherical magnets 262 and the spherically-dished magnets 252 in the x direction and the y direction illustrated in FIGS. 3A and 3B. The spherical magnets 266 and the capsule-dished magnets 256 can have corresponding shapes, which provides for a small amount of relative travel between the spherical magnets 266 and the capsule-dished magnets 256 in the y direction illustrated in FIGS. 3A and 3B. The capsule-dished magnets 256 have a longitudinal axis extending in the x direction of FIG. 3A. This provides for a greater amount of relative travel between the spherical magnets 266 and the capsule-dished magnets 256 in the x direction illustrated in FIGS. 3A and 3B. The distances and directions that each of the magnets 252, 256, 262, and 266 are allowed to travel relative to one another can be controlled by appropriately selecting the sizes and shapes of each of the magnets 252, 256, 262, and 266.

In the example illustrated in FIGS. 3A and 3B, the receptacles 250 and 254 and the magnets 252 and 256 in the facial interface frame 204 and the receptacles 260 and 264 and the magnets 262 and 266 in the removable facial interface 202 are visible to a user. In addition, the base 214 of the facial interface frame 204 and the removable facial interface 202 are C-shaped and have shapes corresponding to one another. This provides visual cues to users that the removable facial interface 202 is meant to mount to the facial interface frame 204. Moreover, if the removable facial interface 202 is not attached to the facial interface frame 204, the facial interface frame 204 looks as though a piece is missing. This encourages a user to install the removable facial interface 202 onto the facial interface frame 204 so that the HMD can be comfortably donned. In some examples, any of the receptacles 250, 254, 260, and 264 and/or the magnets 252, 256, 262, and 266 can be covered or otherwise hidden from view.

The magnets 252, 262 can datum relative to one another (e.g., maintain relatively fixed positions relative to one another), and the magnets 256, 266 can float relative to one another (e.g., move relative to one another). Although the magnets 252, 256, 262, and 266 are illustrated in particular positions in the example of FIGS. 3A and 3B, any of the magnets 252, 256, 262, and 266 can be positioned in any desired positions relative to the removable facial interface 202 and the facial interface frame 204, depending on areas of the removable facial interface 202 and the facial interface frame 204 that are desired to remain fixed or float. Moreover, the magnets 252, 256, 262, and 266 and the receptacles 250, 254, 260, and 264 can have varying shapes and sizes, which can improve the ability to interchange various removable facial interfaces 202 and facial interface frames 204, and can aid in the alignment of the removable facial interface 202 relative to the facial interface frame 204. In some examples, the variable shapes and/or sizes of the magnets 252, 256, 262, and 266 and the receptacles 250, 254, 260, and 264 around the perimeters of the removable facial interface 202 and the facial interface frame 204 can allow for different shaped removable facial interfaces 202 and facial interface frames 204 to be connected together.

Any of the features, components, and/or parts, including the arrangements and configurations thereof shown in FIGS. 3A and 3B can be included, either alone or in any combination, in any of the other examples of devices, features, components, and parts shown in the other figures, including in any of FIGS. 3A and 3B, described herein. Likewise, any of the features, components, and/or parts, including the arrangements and configurations thereof shown and described with reference to the other figures can be included, either alone or in any combination, in the example of the devices, features, components, and parts shown in FIGS. 3A and 3B.

Figure 4:
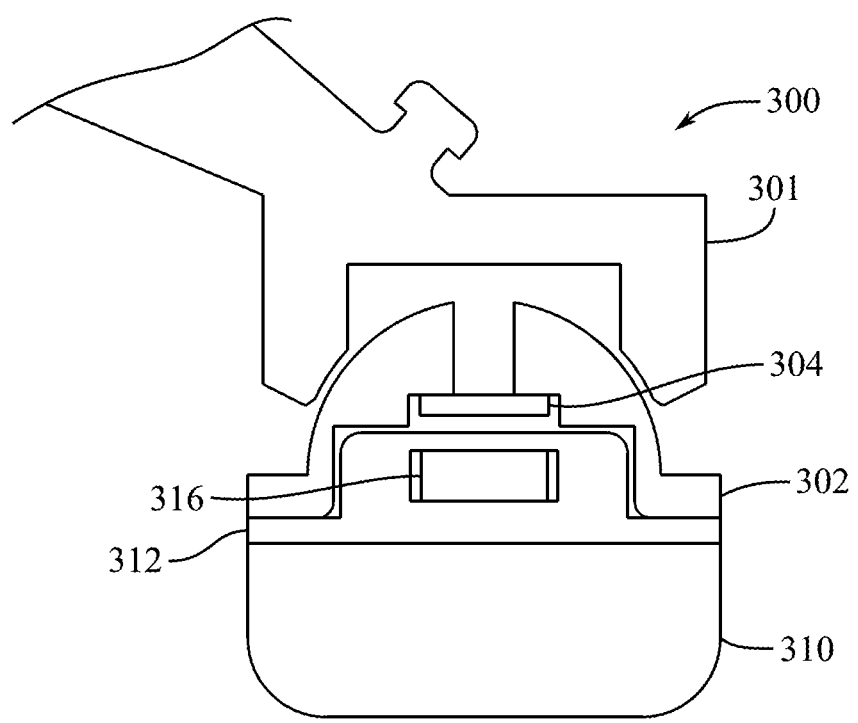
FIG. 4 is a cross-sectional view of an example of a magnetic attachment mechanism.

FIG. 4 illustrates a cross-sectional view of a magnetic attachment mechanism 300, which is an example of a post mount. The magnetic attachment mechanism 300 includes a connector 301, which can be magnetically attached to a base 310. The connector 301 can be substantially similar to, including some or all of the features of, the connectors described herein, such as the connectors 212. The base 310 can be substantially similar to, including some or all of the features of, the stiffeners described herein, such as the stiffeners of the removable facial interfaces 202. The connector 301 can be physically coupled to a receptacle 302, which can be physically coupled to a magnet 304. The base 310 can be physically coupled to a protrusion 312, which can surround or otherwise house a magnet 316.

As illustrated in FIG. 4, the protrusion 312 and the receptacle 302 can have shapes that are configured to correspond to one another. For example, the receptacle 302 can include a squared opening, and the protrusion 312 can have a squared shape configured to fit into the squared opening of the receptacle 302. The protrusion 312 can be an alignment post. Providing the protrusion 312 and the receptacle 302 with corresponding shapes aids in self-aligning a removable facial interface with a facial interface frame when the removable facial interface is attached to the facial interface frame. The magnet 304 and the magnet 316 are then attracted to one another and retain the protrusion 312 in the receptacle 302.

Any of the features, components, and/or parts, including the arrangements and configurations thereof shown in FIG. 4 can be included, either alone or in any combination, in any of the other examples of devices, features, components, and parts shown in the other figures, including in any of FIG. 4, described herein. Likewise, any of the features, components, and/or parts, including the arrangements and configurations thereof shown and described with reference to the other figures can be included, either alone or in any combination, in the example of the devices, features, components, and parts shown in FIG. 4.

Figure 5A:
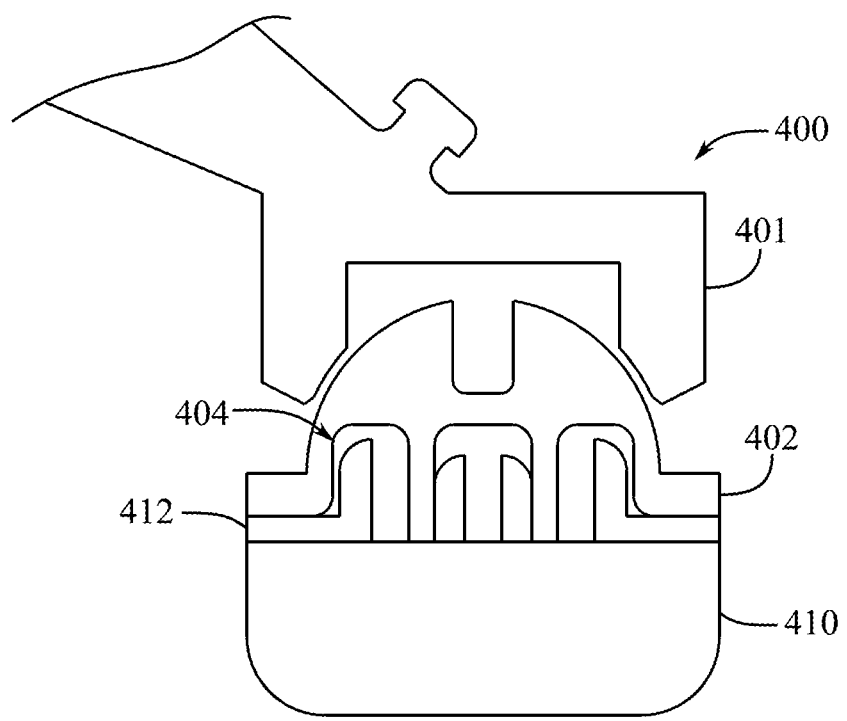
FIG. 5A is a cross-sectional view of an example of an interlocking attachment mechanism.

FIG. 5A illustrates a cross-sectional view of an interlocking attachment mechanism 400, which is an example of a post mount. The interlocking attachment mechanism 400 can be referred to as an interlocking fastener. The interlocking attachment mechanism 400 includes a connector 401, to which a base 410 can be attached. The connector 401 can be substantially similar to, including some or all of the features of, the connectors described herein, such as the connectors 212. The base 410 can be substantially similar to, including some or all of the features of, the stiffeners described herein, such as the stiffeners of the removable facial interfaces 202. The connector 401 can be physically coupled to a receptacle 402, which can include one or more openings 404. In the cross-sectional view illustrated in FIG. 5A, the receptacle 402 includes three openings 404; however, the receptacle 402 of FIG. 5A can include two openings 404 that are circular- or annular-shaped in a bottom-up view. Any number of openings 404 can be included in the receptacle 402. The base 410 can be physically coupled to protrusions 412. The protrusions 412 can have shapes corresponding to the openings 404, such as having circular- or annular-shapes in a top-down view. In some examples, the openings 404 and the protrusions 412 can have triangular shapes, rectangular shapes, or any other suitable shapes. Providing the openings 404 and the protrusions 412 with corresponding shapes aids in self-aligning the base 410 with the connector 401.

The protrusions 412 can be configured to interface with the openings 404 in the receptacle 402 to attach the base 410 to the connector 401 when the base 410 and the connector 401 are pressed together. The protrusions 412 and the receptacle 402 can be formed of elastic, flexible materials with high coefficients of friction. In examples in which the protrusions 412 and the receptacle 402 are formed from elastic materials, the interlocking attachment mechanism 400 may be referred to as an interlocking elastic fastener. Forming the protrusions 412 and the receptacle 402 from flexible materials allows the protrusions 412 to be inserted into the openings 404. Forming the protrusions 412 and the receptacle 402 from elastic materials having high coefficients of friction helps to retain the protrusions 412 in the openings 404 once the protrusions 412 are inserted into the openings 404. In some examples, the protrusions 412 and the receptacle 402 can be formed of polymers, elastomers, plastics, combinations thereof, or the like. Providing the protrusions 412 and the openings 404 in the receptacle 402 with corresponding shapes aids in self-aligning a removable facial interface with a facial interface frame when the removable facial interface is attached to the facial interface frame.

Figure 5B:
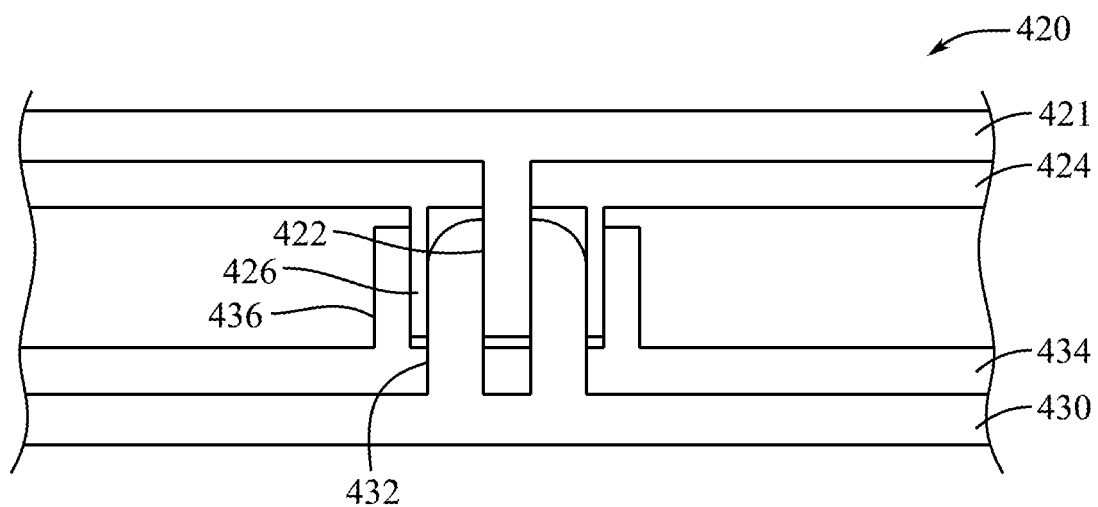
FIG. 5B is a cross-sectional view of an example of an interlocking attachment mechanism.

FIG. 5B illustrates a cross-sectional view of an interlocking attachment mechanism 420, which is an example of a perimeter mount. The interlocking attachment mechanism 420 can be referred to as an interlocking fastener. The interlocking attachment mechanism 420 includes a base 421, which can be physically attached to a base 430. The base 421 can be substantially similar to, including some or all of the features of, the bases of the facial interface frames described herein, such as the base 214. The base 430 can be substantially similar to, including some or all of the features of, the stiffeners described herein, such as the stiffeners of the removable facial interfaces 202. The base 421 can be physically coupled to an outer layer 424. The base 421 can include one or more protrusions 422 and the outer layer 424 can include one or more protrusions 426. The base 430 can be physically coupled to an outer layer 434. The base 430 can include one or more protrusions 436 and the outer layer 434 can include one or more protrusions 436. Any number of protrusions can be included in the base 421, the outer layer 424, the base 430, and the outer layer 434.

The protrusions 432 and 436 of the base 430 can have shapes corresponding to the protrusions 422 and 426 of the base 421. For example, the protrusion 422 can have a shape corresponding to an opening between the protrusions 432; the protrusions 432 can have shapes corresponding to openings between the protrusion 422 and the protrusions 426; and the protrusions 426 can have shapes corresponding to openings between the protrusions 432 and the protrusions 436. The protrusions 422, 426, 432, and 436 can have longitudinal shapes with open ends and longitudinal axes extending in a direction into and out of the page in the view of FIG. 5B. This allows for the base 430 to slide relative to the base 421. This can aid a user in attaching a removable facial interface of an HMD to a facial interface frame. Further, this allows for the removable facial interface to conform to the user's face when the user dons the HMD.

The protrusions 432 and 436 of the base 430 can be configured to interface with the protrusions 422 and 426 of the base 421 to attach the base 430 to the base 421 when the base 430 and the base 421 are pressed together. The protrusions 422, 426, 432, and 436, the outer layers 424 and 434, and the bases 421 and 430 can be formed of elastic, flexible materials with high coefficients of friction. In examples in which the protrusions 422, 426, 432, and 436 are formed from elastic materials, the interlocking attachment mechanism 420 may be referred to as an interlocking elastic fastener. The outer layers 424 and 434 and the bases 421 and 430 can be formed of any combinations of materials, such as the base 421 and the outer layer 424 being formed of the same or different materials and the base 430 and the outer layer 434 being formed of the same or different materials. Forming the protrusions 422, 426, 432, and 436 from flexible materials allows the protrusions 422, 426, 432, and 436 to be inserted into corresponding openings. Forming the protrusions 422, 426, 432, and 436 from elastic materials having high coefficients of friction helps to retain the protrusions 422, 426, 432, and 436 in the corresponding openings once the protrusions 422, 426, 432, and 436 are inserted into the corresponding openings. In some examples, the protrusions 422, 426, 432, and 436, the outer layers 424 and 434, and the bases 421 and 430 can be formed of polymers, elastomers, plastics, combinations thereof, or the like.

Any of the features, components, and/or parts, including the arrangements and configurations thereof shown in FIGS. 5A and 5B can be included, either alone or in any combination, in any of the other examples of devices, features, components, and parts shown in the other figures, including in any of FIGS. 5A and 5B, described herein. Likewise, any of the features, components, and/or parts, including the arrangements and configurations thereof shown and described with reference to the other figures can be included, either alone or in any combination, in the example of the devices, features, components, and parts shown in FIGS. 5A and 5B.

Figure 6:
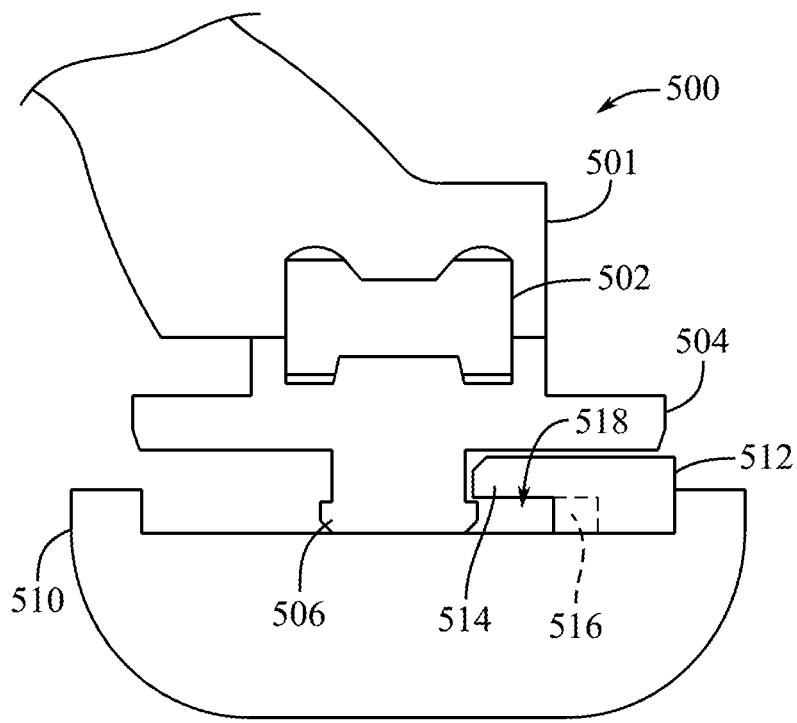
FIG. 6 is a cross-sectional view of an example of a magnetic slide attachment mechanism.

FIG. 6 illustrates a cross-sectional view of a magnetic slide attachment mechanism 500, which is an example of a post mount. The magnetic slide attachment mechanism 500 includes a connector 501, to which a base 510 can be attached. The connector 501 can be substantially similar to, including some or all of the features of, the connectors described herein, such as the connectors 212. The base 510 can be substantially similar to, including some or all of the features of, the stiffeners described herein, such as the stiffeners of the removable facial interfaces 202.

The connector 501 can be physically coupled to a magnetic post 504 through a fastener 502. The magnetic post 504 can include a flange 506. The base 510 can be physically coupled to a magnetic protrusion 512. The magnetic post 504 is magnetically attracted to the magnetic protrusion 512, which helps to align the connector 501 with the base 510, and helps to secure the flange 506 of the magnetic post 504 under a lip 514 of the magnetic protrusion 512. A magnet 516 of the magnetic protrusion 512 can be disposed under the lip 514 of the magnetic protrusion 512 to pull the magnetic post 504 into an opening 518 of the magnetic protrusion 512 under the lip 514 of the magnetic protrusion 512. In the view of FIG. 6, the magnetic post 504 can move from left to right as the connector 501 is attached to the base 510. In other words, the magnetic post 504 can be slidably engaged with the magnetic protrusion 512 by sliding the flange 506 under the lip 514. The connector 501 can be removed from the base 510 by moving the magnetic post 504 from right to left, then moving the magnetic post 504 in an upwards direction once the flange 506 of the magnetic post 504 clears the lip 514 of the protrusion 512. In other words, the magnetic post 504 can be slidably disengaged with the magnetic protrusion 512 by sliding the flange 506 out from under the lip 514.

Any of the features, components, and/or parts, including the arrangements and configurations thereof shown in FIG. 6 can be included, either alone or in any combination, in any of the other examples of devices, features, components, and parts shown in the other figures, including in any of FIG. 6, described herein. Likewise, any of the features, components, and/or parts, including the arrangements and configurations thereof shown and described with reference to the other figures can be included, either alone or in any combination, in the example of the devices, features, components, and parts shown in FIG. 6.

Figure 7:
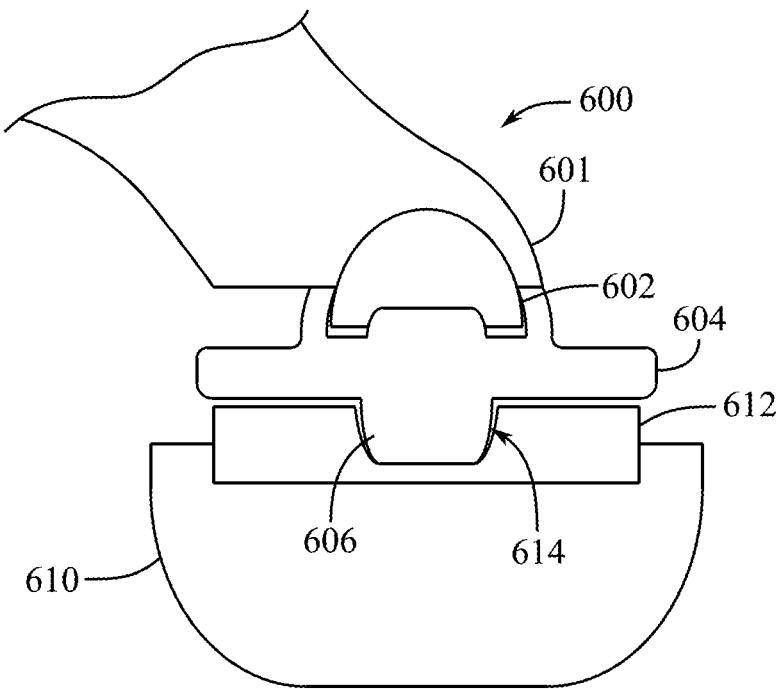
FIG. 7 is a cross-sectional view of an example of a hook-and-loop attachment mechanism.

FIG. 7 illustrates a cross-sectional view of a hook-and-loop attachment mechanism 600, which is an example of a post mount. The hook-and-loop attachment mechanism 600 includes a connector 601, to which a base 610 can be attached. The connector 601 can be substantially similar to, including some or all of the features of, the connectors described herein, such as the connectors 212. The base 610 can be substantially similar to, including some or all of the features of, the stiffeners described herein, such as the stiffeners of the removable facial interfaces 202.

The connector 601 can be physically coupled to a hook-and-loop feature 604 through a fastener 602. The hook-and-loop feature 604 can include a post 606. The base 610 can be physically coupled to a hook-and-loop feature 612. The hook-and-loop feature 604 can include an opening 614 configured to receive the post 606. In the example of FIG. 7, the post 606 and the opening 614 can have corresponding frustum shapes, however any suitable shapes can be used. The opening 614 and the post 606 can be included to aid in self-aligning the connector 601 and the base 610; however, in some examples, the opening 614 and the post 606 can be omitted.

One of the hook-and-loop feature 604 or the hook-and-loop feature 612 can include a plurality of hooks, and the other of the hook-and-loop feature 604 or the hook-and-loop feature 612 can include a plurality of loops. The hooks of the hook-and-loop feature 604 or the hook-and-loop feature 612 are retained in the corresponding loops of the hook-and-loop feature 604 or the hook-and-loop feature 612 in order to attach the base 610 to the connector 601. Velcro is an example of a hook-and-loop attachment mechanism that can be used for the hook-and-loop feature 604 and the hook-and-loop feature 612. Fine hook and loop features can be provided in the hook-and-loop feature 604 and/or the hook-and-loop feature 612 in order to lessen a tearing sound when the connector 601 and the base 610 are separated from one another.

Any of the features, components, and/or parts, including the arrangements and configurations thereof shown in FIG. 7 can be included, either alone or in any combination, in any of the other examples of devices, features, components, and parts shown in the other figures, including in any of FIG. 7, described herein. Likewise, any of the features, components, and/or parts, including the arrangements and configurations thereof shown and described with reference to the other figures can be included, either alone or in any combination, in the example of the devices, features, components, and parts shown in FIG. 7.

Figure 8:
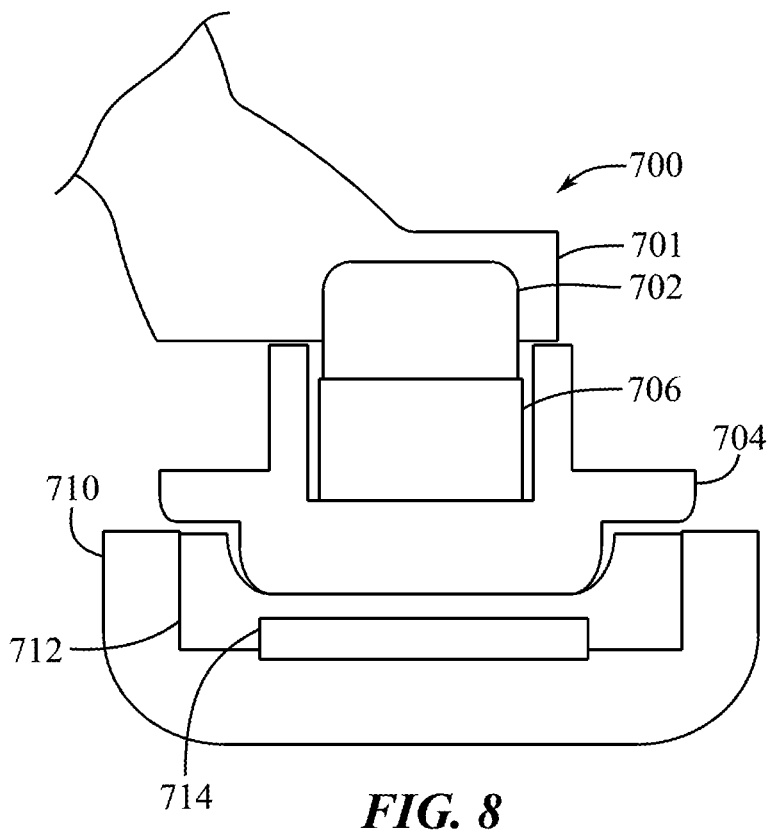
FIG. 8 is a cross-sectional view of an example of a magnetic attachment mechanism.

FIG. 8 illustrates a cross-sectional view of a magnetic attachment mechanism 700, which is an example of a post mount. The magnetic attachment mechanism 700 includes a connector 701, which can be magnetically attached to a base 710. The connector 701 can be substantially similar to, including some or all of the features of, the connectors described herein, such as the connectors 212. The base 710 can be substantially similar to, including some or all of the features of, the stiffeners described herein, such as the stiffeners of the removable facial interfaces 202.

The connector 701 can be physically coupled to a magnet 706 through a fastener 702. The connector 701 can be further physically coupled to a post 704, which houses the magnet 706. In some examples, the post 704 can be referred to as a protrusion, and the magnet 706 can be disposed in the protrusion. The base 710 can be physically coupled to a magnet 714, and a receptacle 712 can be physically coupled to the base 710 and/or the magnet 714. In some examples, the magnet 714 can be disposed in the receptacle 712. As illustrated in FIG. 8, the receptacle 712 can include an opening configured to receive the post 704. In the example of FIG. 8, the post 704 and the opening of the receptacle 712 can have corresponding frustum shapes, however any suitable shapes can be used. In some examples, the post 704 (e.g., the protrusion) and the receptacle 712 have shapes that are complementary to one another, such that they can nest, stack, or be received in one-another. The opening of the receptacle 712 and the post 704 can be included to aid in self-aligning the connector 701 and the base 710; however, in some examples, the opening of the receptacle 712 and the post 704 can be omitted. The magnet 706 and 714 are magnetically attracted to one another and retain the post 704 of the connector 701 within the opening of the receptacle 712 of the base 710.

Any of the features, components, and/or parts, including the arrangements and configurations thereof shown in FIG. 8 can be included, either alone or in any combination, in any of the other examples of devices, features, components, and parts shown in the other figures, including in any of FIG. 8, described herein. Likewise, any of the features, components, and/or parts, including the arrangements and configurations thereof shown and described with reference to the other figures can be included, either alone or in any combination, in the example of the devices, features, components, and parts shown in FIG. 8.

Figure 9:
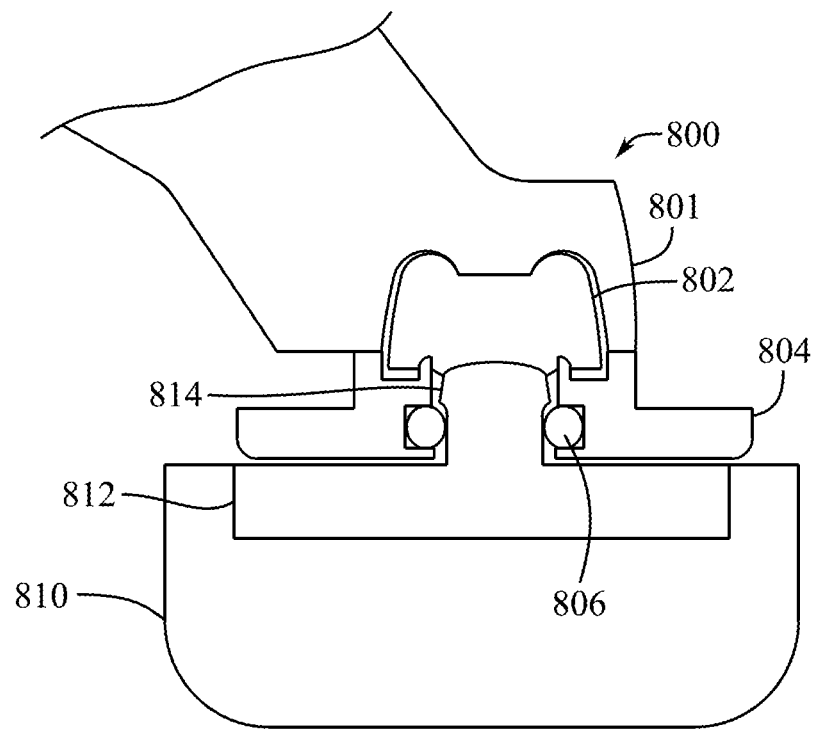
FIG. 9 is a cross-sectional view of an example of a spring snap attachment mechanism.

FIG. 9 illustrates a cross-sectional view of a spring-snap attachment mechanism 800, which is an example of a post mount. The spring-snap attachment mechanism 800 includes a connector 801, which can be physically attached to a base 810. The connector 801 can be substantially similar to, including some or all of the features of, the connectors described herein, such as the connectors 212. The base 810 can be substantially similar to, including some or all of the features of, the stiffeners described herein, such as the stiffeners of the removable facial interfaces 202.

The connector 801 is physically coupled to a spring-snap feature 804 through a fastener 802. The spring-snap feature 804 includes detents 806 that are attached to the spring-snap feature 804 through springs in the spring-snap feature 804. The base 810 is physically coupled to a post 812, which includes flange 814. When the base 810 is attached to the connector 801, the flange 814 of the post 812 push the detents 806 outwards relative to the post 812 and into openings in the spring-snap feature 804. Once the flange 814 pass the detents 806, the springs of the spring-snap feature 804 push the detents 806 against the post 812 to retain the flange 814 of the post 812 within an opening of the spring-snap feature 804. In other words, the spring force of the spring-snap feature 804 pressing the detents 806 against the post 812 adjacent the flange 814 retains the post 812 within the spring-snap feature 804, attaching the base 810 to the connector 801. When the base 810 is removed from the connector 801, this same process occurs in reverse. In the example of FIG. 9, the post 812 and the opening of the spring-snap feature 804 that receives the post can have corresponding cylindrical shapes, however any suitable shapes can be used. The opening of the spring-snap feature 804 and the post 812 aid in self-aligning the connector 801 and the base 810.

Any of the features, components, and/or parts, including the arrangements and configurations thereof shown in FIG. 9 can be included, either alone or in any combination, in any of the other examples of devices, features, components, and parts shown in the other figures, including in any of FIG. 9, described herein. Likewise, any of the features, components, and/or parts, including the arrangements and configurations thereof shown and described with reference to the other figures can be included, either alone or in any combination, in the example of the devices, features, components, and parts shown in FIG. 9.

Figure 10:
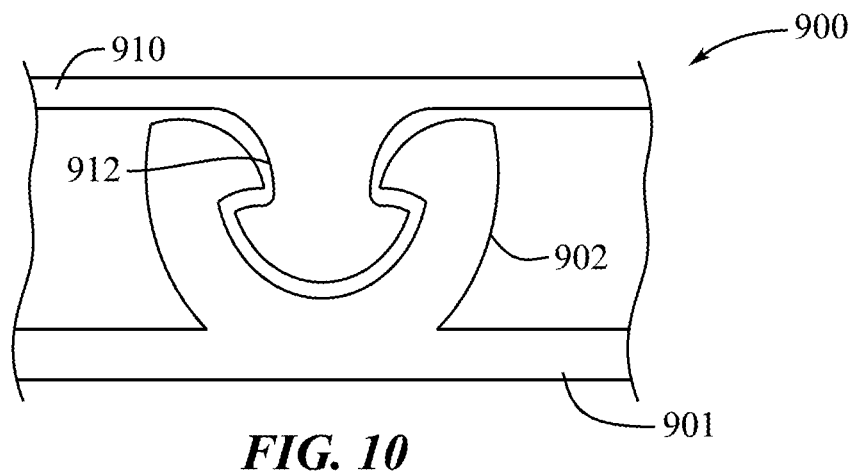
FIG. 10 is a cross-sectional view of an example of an interlocking attachment mechanism.

FIG. 10 illustrates a cross-sectional view of an interlocking attachment mechanism 900, which is an example of a post mount or a perimeter mount. The interlocking attachment mechanism 900 can be referred to as an interlocking fastener. The interlocking attachment mechanism 900 includes a base 910, which can be interlocked with a base 901. The base 901 or 910 can be substantially similar to, including some or all of the features of, the bases of the facial interface frames described herein, such as the base 214. The other of the base 901 or 910 can be substantially similar to, including some or all of the features of, the stiffeners described herein, such as the stiffeners of the removable facial interfaces 202. The base 901 can include a plurality of protrusions 902, such as two protrusions 902 in the example of FIG. 10. The base 910 can include a protrusion 912. In some examples, any number of protrusions 912 and 902 can be included in the base 910 and the base 901.

As illustrated in FIG. 10, the protrusion 912 can be configured to interlock with the protrusions 902. The protrusion 912 can be mushroom-shaped and can have a flange at an end of a post. The protrusions 902 can define an opening and include lips adjacent to the protrusion 912 when the protrusion 912 is inserted into the opening defined by the protrusions 902. The lips of the protrusions 902 and the flange of the protrusion 912 can secure the protrusion 912 within the opening defined between the protrusions 902.

In some examples, the protrusions 902 and 912 can have longitudinal shapes with open ends and longitudinal axes extending in a direction into and out of the page in the view of FIG. 10. This allows for the base 901 to slide relative to the base 910. This can aid a user in attaching a removable facial interface of an HMD to a facial interface frame. Further, this allows for the removable facial interface to conform to the user's face when the user dons the HMD. In some examples, the protrusion 912 can have a circular shape in a bottom-up view and the protrusions 902 can have an annular shape in a top-down view. In some examples, the protrusions 902 and 912 can have triangular, rectangular, or other shapes in bottom-up and top-down views, respectively. Providing the protrusions 902 and 912 with corresponding shapes aids in self-aligning the base 901 with the base 910.

The protrusions 902 and 912 can be formed of elastic, flexible materials with high coefficients of friction. In examples in which the protrusions 902 and 912 are formed from elastic materials, the interlocking attachment mechanism 900 may be referred to as an interlocking elastic fastener. The protrusions 902 and 912 can be formed from the same or different materials. Forming the protrusions 902 and 912 from flexible materials allows the protrusion 912 to be inserted into the corresponding opening between the protrusions 902. Forming the protrusions 902 and 912 from elastic materials having high coefficients of friction helps to retain the protrusion 912 in the corresponding opening between the protrusions 902. In some examples, the protrusions 902 and 912 can be formed of polymers, elastomers, plastics, combinations thereof, or the like.

Any of the features, components, and/or parts, including the arrangements and configurations thereof shown in FIG. 10 can be included, either alone or in any combination, in any of the other examples of devices, features, components, and parts shown in the other figures, including in any of FIG. 10, described herein. Likewise, any of the features, components, and/or parts, including the arrangements and configurations thereof shown and described with reference to the other figures can be included, either alone or in any combination, in the example of the devices, features, components, and parts shown in FIG. 10.

Figure 11:
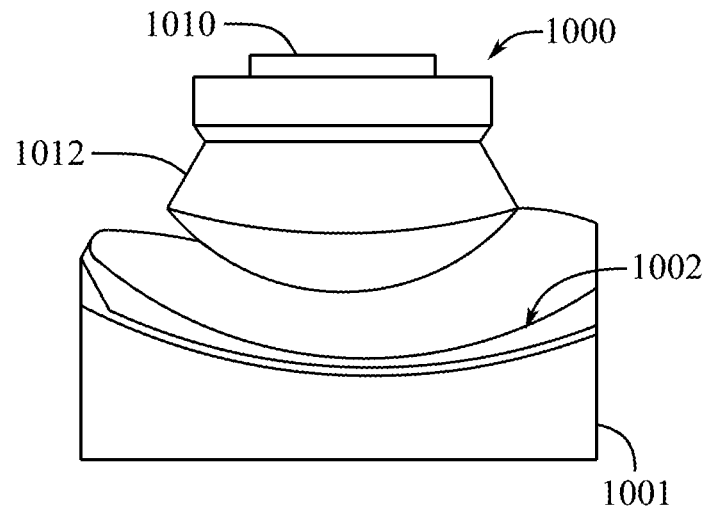
FIG. 11 is a cross-sectional view of an example of a suction attachment mechanism.

FIG. 11 illustrates a cross-sectional view of a suction attachment mechanism 1000, which is an example of a post mount. The suction attachment mechanism 1000 includes a connector 1010, which can be attached to a base 1001 through a suction force. The connector 1010 can be substantially similar to, including some or all of the features of, the connectors described herein, such as the connectors 212. The base 1001 can be substantially similar to, including some or all of the features of, the stiffeners described herein, such as the stiffeners of the removable facial interfaces 202.

The base 1001 can include a curved opening 1002 formed at a top surface thereof. In some examples, the curved opening 1002 may be referred to as a curved surface. A suction cup 1012 can be physically coupled to the connector 1010. The base 1001 can be attached to the connector 1010 by pressing the suction cup 1012 into the curved opening with sufficient force. The connector 1010 can be removed from the base 1001 by pulling the connector 1010 away from the base 1001 with sufficient force. Removing the connector 1010 from the base 1001 can be aided by tilting the connector 1010 relative to the base 1001. The curved opening 1002 of the base 1001 can have a smooth hard surface, which can be surrounded by softer surfaces, such as fabrics or the like. This aids in self-aligning the base 1001 and the connector 1010, as the suction cup 1012 cannot easily be mounted to portions of the base 1001 surrounding the curved opening 1002.

Any of the features, components, and/or parts, including the arrangements and configurations thereof shown in FIG. 11 can be included, either alone or in any combination, in any of the other examples of devices, features, components, and parts shown in the other figures, including in any of FIG. 11, described herein. Likewise, any of the features, components, and/or parts, including the arrangements and configurations thereof shown and described with reference to the other figures can be included, either alone or in any combination, in the example of the devices, features, components, and parts shown in FIG. 11.

Figure 12:
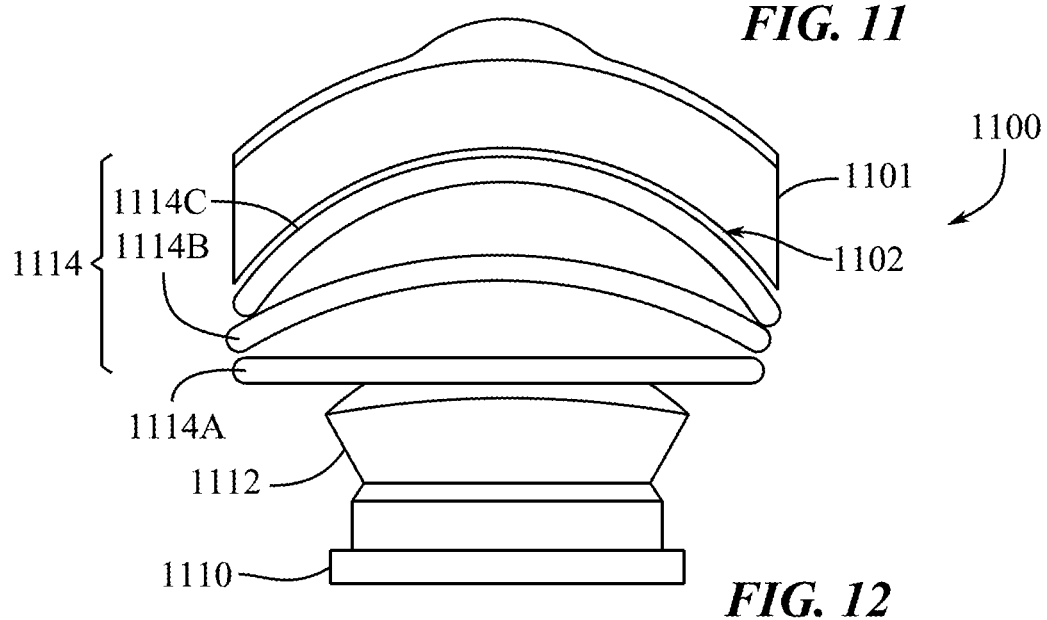
FIG. 12 is a cross-sectional view of an example of a bi-stable attachment mechanism.

FIG. 12 illustrates a cross-sectional view of a bi-stable attachment mechanism 1100, which is an example of a post mount. The bi-stable attachment mechanism 1100 includes a connector 1101, which can be attached to a base 1110 through a suction force. The connector 1101 can be substantially similar to, including some or all of the features of, the connectors described herein, such as the connectors 212. The base 1110 can be substantially similar to, including some or all of the features of, the stiffeners described herein, such as the stiffeners of the removable facial interfaces 202.

The connector 1101 can include a curved opening 1102 formed at a bottom surface thereof. A bi-stable element 1114 can be physically coupled to the base 1110 through a joint 1112. The bi-stable element 1114 can be stable in two positions, such as a first position 1114A and a second position 1114C. The third position 1114B is an intermediate position between the first position 1114A and the second position 1114C. The bi-stable element 1114 can flip between the first position 1114A and the second position 1114C. For example, when the connector 1101 is pressed into the base 1110, the bi-stable element 1114 can move from the first position 1114A to the second position 1114C. When the connector 1101 is pulled from the base 1110, the bi-stable element 1114 can move from the second position 1114C to the first position 1114A. The connector 1101 can be attached to the base 1110 through a suction force similar to the suction attachment mechanism 1100. Removing the connector 1101 from the base 1110 can be aided by tilting the connector 1101 relative to the base 1110. The curved opening 1102 of the connector 1101 can have a smooth hard surface, which can be surrounded by softer surfaces, such as fabrics or the like. This aids in self-aligning the base 1110 and the connector 1101, as the bi-stable element 1114 cannot easily be mounted to portions of the connector 1101 surrounding the curved opening 1102.

Any of the features, components, and/or parts, including the arrangements and configurations thereof shown in FIG. 12 can be included, either alone or in any combination, in any of the other examples of devices, features, components, and parts shown in the other figures, including in any of FIG. 12, described herein. Likewise, any of the features, components, and/or parts, including the arrangements and configurations thereof shown and described with reference to the other figures can be included, either alone or in any combination, in the example of the devices, features, components, and parts shown in FIG. 12.

Figure 13A:
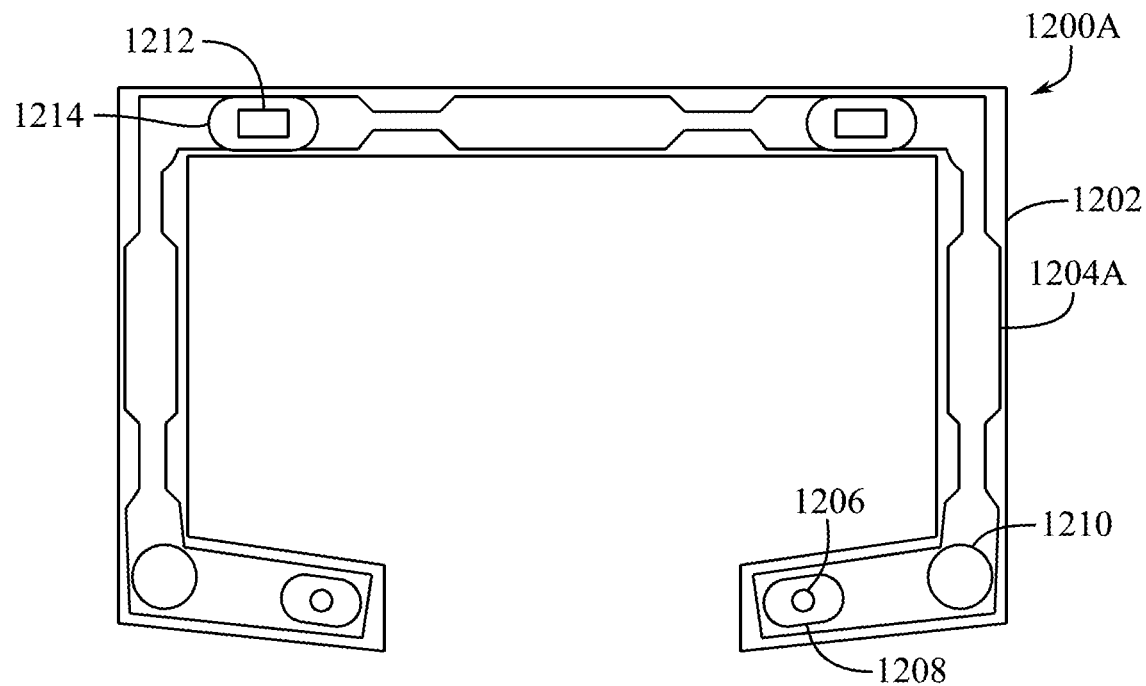
FIG. 13A is a plan view of an example of a removable facial interface.
Figure 13B:
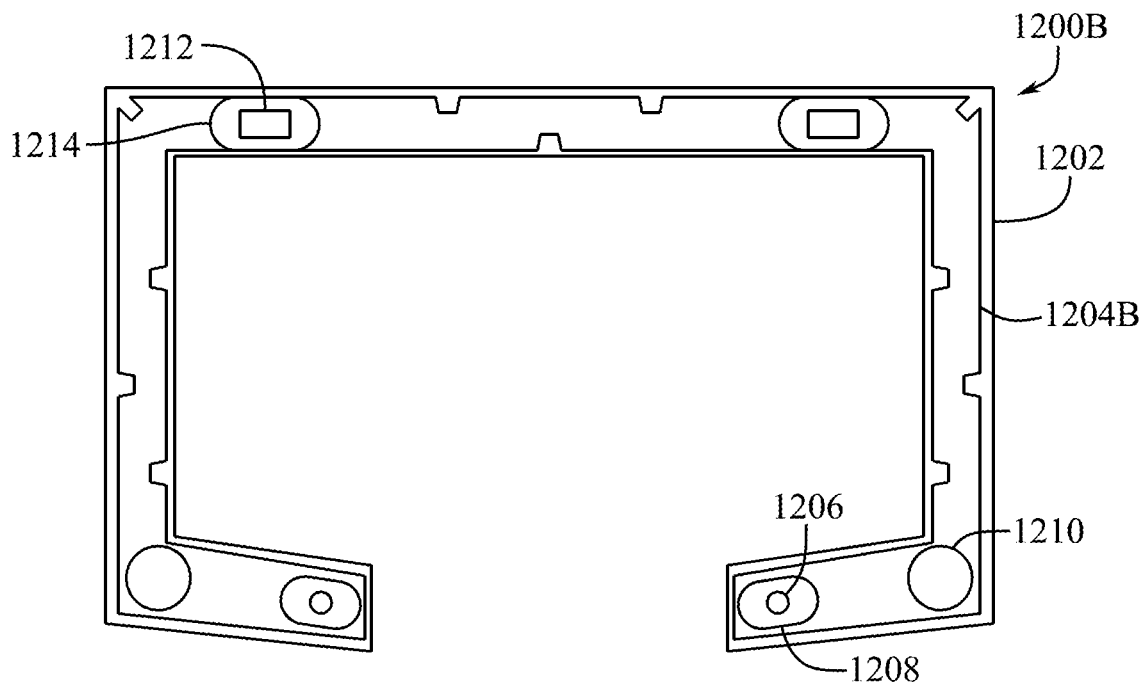
FIG. 13B is a plan view of an example of a removable facial interface.

FIGS. 13A and 13B are plan views of removable facial interfaces 1200A and 1200B, respectively. The removable facial interfaces 1200A and 1200B include a base 1204A and a base 1204B, respectively. A pliant material 1202 can be formed surrounding the respective bases 1204A and 1204B. Top mounts 1214, side mounts 1210, and bottom mounts 1208 can be physically coupled to the respective bases 1204A and 1204B through the pliant material 1202. Any of the above-described attachment mechanisms, such as the post attachments, can be provided on the top mounts 1214, the side mounts 1210, and the bottom mounts 1208. Additional attachment mechanisms, such as the perimeter attachments, can be provided on the removable facial interfaces 1200A and 1200B, such as along the bases 1204A and 1204B between the top mounts 1214, the side mounts 1210, and the bottom mounts 1208. FIGS. 13A and 13B illustrate magnets 1212 and 1206 physically coupled to the top mounts 1214 and the bottom mounts 1208, respectively. Although 6 mounts are illustrated as being provided for the removable facial interfaces 1200A and 1200B; any number of mounts can be provided.

In the example of FIG. 13A, the base 1204A includes thick portions and thin portions. The thick portions can be included to provide stiffness to the removable facial interface 1200A, while the thin portions can be included to provide flexibility to the removable facial interface 1200A. In the example of FIG. 13B, the base 1204B includes slits formed along the perimeter of the base 1204B. The slits portions can be included to provide flexibility to the removable facial interface 1200B. Any suitable bases with any suitable configurations can be included to provide desired flexibility and stiffness to the removable facial interfaces.

The bases 1204A and 1204B can be formed from metals, plastics, polymers, combinations thereof, or the like. The pliable material 1202 can be formed from rubbers, foams, polymers, silicone, elastomers, hydrogen gels, combinations thereof, or the like. The removable facial interfaces 1200A and 1200B further include a fabric material surrounding the pliable material 1202, the top mounts 1214, the side mounts 1210, and the bottom mounts 1208. The fabric material may encircle the top mounts 1214, the side mounts 1210, and the bottom mounts 1208, and the top mounts 1214, the side mounts 1210, and the bottom mounts 1208 may be exposed through the fabric material. The bases 1204A and 1204B can provide the removable facial interfaces 1200A and 1200B with a desired degree of stiffness. The pliable material 1202 can be pliant or semi-pliant and can be provided to increase user comfort. The fabric material can be configured to contact a user's skin, and can also be provided to increase user comfort.

Any of the features, components, and/or parts, including the arrangements and configurations thereof shown in FIGS. 13A and 13B can be included, either alone or in any combination, in any of the other examples of devices, features, components, and parts shown in the other figures, including in any of FIGS. 13A and 13B, described herein. Likewise, any of the features, components, and/or parts, including the arrangements and configurations thereof shown and described with reference to the other figures can be included, either alone or in any combination, in the example of the devices, features, components, and parts shown in FIGS. 13A and 13B.

Examples of the present disclosure can provide various advantages. For example, HMDs can include removable facial interfaces, which are removably attached to respective facial interface frames. Providing the removable facial interfaces allows the removable facial interfaces to be removed, cleaned and replaced, which improves the cleanliness of the HMDs. Users of the HMDs can easily replace the removable facial interfaces based on the users' unique facial structures, personal preferences, user use of the HMDs, and the like. Moreover, worn removable facial interfaces can be cheaply replaced, which reduces maintenance costs of the HMDs.

While the present exemplary systems and methods are functional without gathering personal information data, in some examples, personal information data may be collected and used to provide a customized or personal experience. In examples where personal information data is gathered, stored, used, and/or disseminated by the present exemplary systems and methods, such gathering, storage, use, and/or dissemination should be performed in accordance with standard and well recognized policies and procedures directed at avoiding unintentional access or dissemination.

The preceding description includes specific nomenclature to provide a thorough understanding of the described examples. However, the specific details, examples, and embodiments are not required in order to practice the exemplary systems and methods. Rather, the foregoing descriptions are presented for purposes of illustration and description and are not intended to be exhaustive or to limit the examples to the precise forms disclosed. Many modifications and variations are possible in view of the above teachings.

What is claimed is:

1. A head-mountable device (HMD) comprising:
a display;
a facial interface frame at least partially surrounding the display;
a removable facial interface attached to the facial interface frame and configured to contact a user's face, the facial interface frame disposed between the removable facial interface and the display;
a first attachment mechanism attached to one of the facial interface frame or the removable facial interface; and
a second attachment mechanism attached to the other of the facial interface frame or the removable facial interface, the removable facial interface attached to the facial interface frame by the first attachment mechanism and the second attachment mechanism.

2. The HMD of claim 1, wherein the first attachment mechanism and the second attachment mechanism comprise magnets.

3. The HMD of claim 1, wherein:
the first attachment mechanism comprises a spherical magnetic receptacle; and
the second attachment mechanism comprises a spherical magnet.

4. The HMD of claim 1, wherein:
the first attachment mechanism comprises a capsule-dished magnetic receptacle; and
the second attachment mechanism comprises a spherical magnet.

5. The HMD of claim 1, wherein:
the first attachment mechanism comprises a magnetic post;
the second attachment mechanism comprises a magnetic protrusion; and
the first attachment mechanism is configured to slidably engage and disengage the second attachment mechanism.

6. The HMD of claim 1, wherein the first attachment mechanism and the second attachment mechanism comprise hook-and-loop fasteners.

7. The HMD of claim 1, wherein:
the first attachment mechanism comprises a post and a flange on the post; and
the second attachment mechanism comprises a spring-snap feature, the spring-snap feature comprising:
an opening;
a detent adjacent the opening; and
a spring attached to the detent.

8. The HMD of claim 1, wherein:
the first attachment mechanism comprises a receptacle and a first magnet in the receptacle;
the second attachment mechanism comprises a protrusion and a second magnet in the protrusion; and
the protrusion has a first shape complementary to a second shape of the receptacle.

9. The HMD of claim 1, wherein the first attachment mechanism and the second attachment mechanism comprise interlocking elastic fasteners.

10. The HMD of claim 1, wherein:
the first attachment mechanism comprises a suction cup; and
the second attachment mechanism comprises a curved surface shaped to interface with the suction cup.

11. The HMD of claim 1, wherein:
the removable facial interface is C-shaped; and
the facial interface frame comprises a C-shaped base complementary to the removable facial interface.

12. The HMD of claim 1, wherein:
the removable facial interface comprises a fabric material encircling one of the first attachment mechanism or the second attachment mechanism;
the facial interface frame comprises a compressible material encircling the other of the first attachment mechanism or the second attachment mechanism; and
the first attachment mechanism is directly attached to the second attachment mechanism.

13. A wearable electronic device comprising:
a display;
a facial interface frame physically coupled to the display, the facial interface frame comprising:
a frame partially surrounding the display;
a connector attached to the frame; and
a base attached to the connector, wherein the connector extends through the base; and
a removable facial interface removably attached to the connector of the facial interface frame by a first attachment mechanism;
wherein the connector extends from the frame and through the base, the connector configured to removably attach the removable facial interface to the facial interface frame.

14. The wearable electronic device of claim 13, wherein the first attachment mechanism comprises a magnetic attachment mechanism, the magnetic attachment mechanism comprising a post on one of the connector or the removable facial interface, and a receptacle on the other of connector or the removable facial interface.

15. The wearable electronic device of claim 13, wherein the first attachment mechanism comprises a hook-and-loop attachment mechanism, the hook-and-loop attachment mechanism comprising a post on one of the connector or the removable facial interface and a receptacle on the other of connector or the removable facial interface.

16. The wearable electronic device of claim 13, further comprising a compressible member attached to the base, the compressible member encircling the connector, and the connector being exposed through the compressible member.

17. A light seal for a head-mountable device including a facial interface frame, the light seal comprising:
a base;
a compressible portion; and
a magnet attached to the base;
wherein the compressible portion is configured to be disposed between the base and a removable facial interface configured to contact a user's face, the magnet configured to attach the removable facial interface to the base.

18. The light seal of claim 17, further comprising a hook-and-loop fastener attached to the base.

19. The light seal of claim 17, further comprising an interlocking fastener attached to the base.

20. The light seal of claim 17, further comprising a receptacle attached to the base.

* * * * *